US012467026B2

(12) United States Patent
Matsumoto

(10) Patent No.: US 12,467,026 B2
(45) Date of Patent: Nov. 11, 2025

(54) CELL CULTURE TOOL AND METHOD FOR PRODUCING CELL CULTURE TOOL

(71) Applicant: KATAOKA CORPORATION, Kyoto (JP)

(72) Inventor: Junichi Matsumoto, Kyoto (JP)

(73) Assignee: Kataoka Corporation, Kyoto (JP)

( * ) Notice: Subject to any disclaimer, the term of this patent is extended or adjusted under 35 U.S.C. 154(b) by 965 days.

(21) Appl. No.: 17/282,065

(22) PCT Filed: Sep. 30, 2019

(86) PCT No.: PCT/JP2019/038605
§ 371 (c)(1),
(2) Date: Apr. 1, 2021

(87) PCT Pub. No.: WO2020/071332
PCT Pub. Date: Apr. 9, 2020

(65) Prior Publication Data
US 2021/0340482 A1 Nov. 4, 2021

(30) Foreign Application Priority Data

Oct. 1, 2018 (JP) ................. 2018-186940
Sep. 27, 2019 (JP) ................. 2019-176857

(51) Int. Cl.
C12M 1/12 (2006.01)
C12M 1/00 (2006.01)

(52) U.S. Cl.
CPC ............ C12M 25/12 (2013.01); C12M 25/18 (2013.01); C12M 31/00 (2013.01)

(58) Field of Classification Search
None
See application file for complete search history.

(56) References Cited

U.S. PATENT DOCUMENTS

| 5,202,227 | A | 4/1993 | Matsuda et al. |
| 2002/0094572 | A1 | 7/2002 | Singhvi et al. |
| 2003/0148393 | A1 | 8/2003 | Woodbury et al. |
| 2003/0219889 | A1* | 11/2003 | Sumaru ................. C12M 47/04 435/287.1 |
| 2005/0276456 | A1 | 12/2005 | Yamato et al. |
| 2006/0019390 | A1 | 1/2006 | Miyake et al. |
| 2007/0122901 | A1 | 5/2007 | Morita et al. |
| 2007/0141697 | A1 | 6/2007 | Hattori et al. |
| 2007/0218554 | A1* | 9/2007 | Miyake ................ C12N 5/0068 435/395 |
| 2007/0259328 | A1 | 11/2007 | Morita et al. |
| 2007/0274968 | A1* | 11/2007 | Hattori ................. C12N 5/0068 435/289.1 |
| 2008/0057558 | A1 | 3/2008 | Niwa et al. |
| 2008/0220985 | A1 | 9/2008 | Bridgman et al. |
| 2008/0227203 | A1 | 9/2008 | Watanabe et al. |
| 2013/0023025 | A1 | 1/2013 | Sumaru et al. |
| 2013/0045187 | A1 | 2/2013 | Semechkin et al. |
| 2014/0011960 | A1 | 1/2014 | Konno et al. |
| 2014/0099695 | A1 | 4/2014 | Furuta et al. |
| 2015/0044770 | A1 | 2/2015 | Kim et al. |
| 2018/0142193 | A1 | 5/2018 | Suzuki et al. |
| 2018/0319867 | A1 | 11/2018 | Koide et al. |

FOREIGN PATENT DOCUMENTS

| EP | 3450471 A1 | 3/2019 |
| JP | H03-007576 A | 1/1991 |
| JP | 2003-009860 A | 1/2003 |
| JP | 2003-088316 A | 3/2003 |
| JP | 2003-339373 A | 12/2003 |
| JP | 4247231 B1 | 4/2009 |
| JP | 4303643 B2 | 7/2009 |
| JP | 2010-046012 A | 3/2010 |
| JP | 2010-088316 A | 4/2010 |
| JP | 2012-210158 A | 11/2012 |
| JP | 5070565 B2 | 11/2012 |
| JP | 5080848 B2 | 11/2012 |
| JP | 2014-509192 A | 4/2014 |
| JP | 2014-200182 A | 10/2014 |
| JP | 2014-226088 A | 12/2014 |
| JP | 2015-195757 A | 11/2015 |
| JP | 2017-112923 A | 6/2017 |
| WO | 2004/037968 A2 | 5/2004 |
| WO | 2005/103227 A1 | 11/2005 |
| WO | 2011/125615 A1 | 10/2011 |
| WO | 2012/141202 A1 | 10/2012 |
| WO | 2015/038011 A1 | 3/2015 |
| WO | 2016/194454 A1 | 12/2016 |

(Continued)

OTHER PUBLICATIONS

US Office Action dated Oct. 15, 2021 received in U.S. Appl. No. 16/853,291.
Notification of Reasons of Rejection issued in Japanese Patent Application No. 2019-176857 dated Nov. 19, 2019 with partial English translation.
Office Action issued in U.S. Appl. No. 15/576,228 dated Oct. 7, 2019.
Notbohm, J. et al., "Two-Dimensional Culture Systems to Enable Mechanics-Based Assays for Stem Cell-Derived Cardiomyocytes", Experimental Mechanics (2019), vol. 59, No. 9, pp. 1235-1248.
Intelligent SubstratesTM, BioWriteTM micropatterned substrate specifications (2010), Intelligent Substrates, Inc.
Intelligent SubstratesTM, BioWriteTM substrate information and protocols (2010), Intelligent Substrates, Inc.

(Continued)

Primary Examiner — Nghi V Nguyen
(74) Attorney, Agent, or Firm — Scully, Scott, Murphy & Presser, P.C.

(57) ABSTRACT

A cell culture tool configured to be produced in a simple facility to obtain a cell mass having a desired shape. The cell culture tool includes a cell culture base layer that contains a cell culture base. The cell culture base layer has a cell adhesive area to which a cell is adherable and a cell adhesion inhibitory area where cell adhesion is inhibited. The cell adhesion inhibitory area includes a modified product of the cell culture base.

14 Claims, 17 Drawing Sheets

(56) References Cited

FOREIGN PATENT DOCUMENTS

WO 2016/208673 A1 12/2016
WO 2017/213226 A1 12/2017

OTHER PUBLICATIONS

Intelligent SubstratesTM, Micropatterned substrates: Highlights from the literature (2009), Intelligent Substrates, Inc.
International Search Report dated Dec. 3, 2019 issued in PCT/JP2019/038605.
Heinz et al., "Laser inactivation protein patterning of cell culture microenvironments", Lab on a Chip (2011), vol. 11, pp. 3336-3346.
Japanese Decision on Refusal dated Aug. 6, 2024 received in 2020-114669.
Japanese Office Action dated Mar. 5, 2024 received in 2020-114669.
Extended European Search Report dated May 27, 2022 received in 19868326.0.
Japanese Office Action dated Jan. 6, 2023 received in 2019-085165.

* cited by examiner

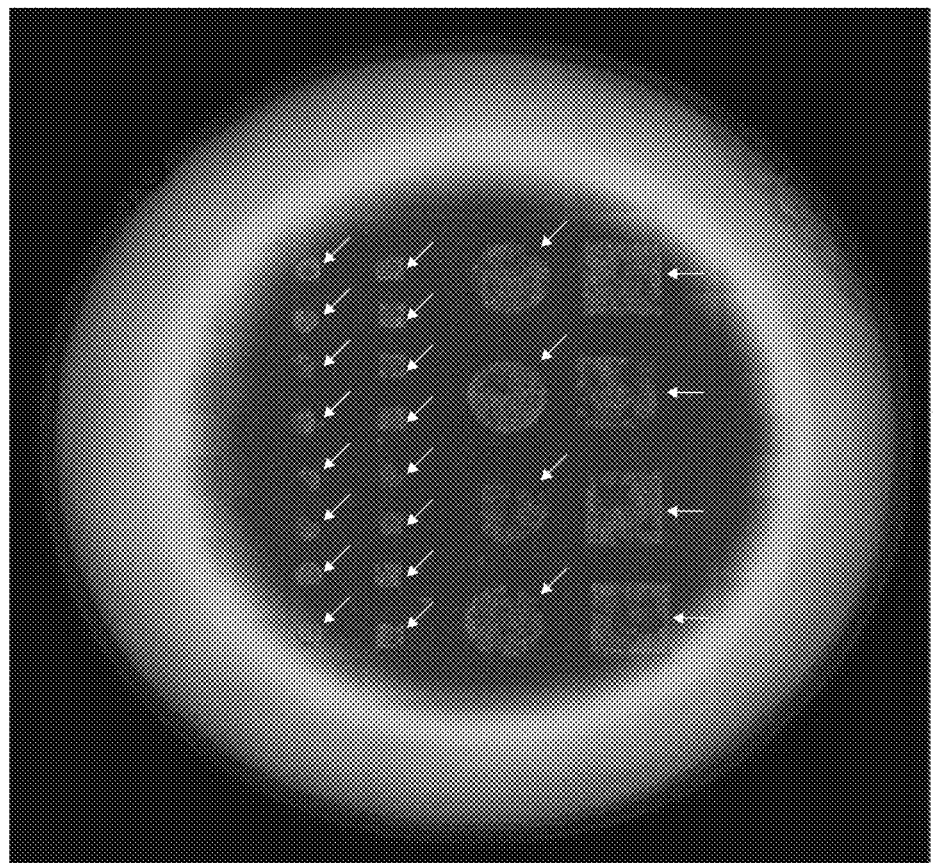
FIG. 11A
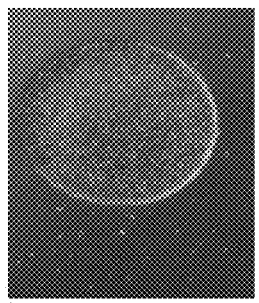      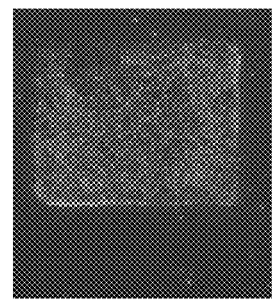
FIG. 11B              FIG. 11C

CELL CULTURE TOOL AND METHOD FOR PRODUCING CELL CULTURE TOOL

CROSS-REFERENCE TO RELATED APPLICATIONS

The present application is based upon and claims the benefit of priority from PCT/JP2019/038605 filed on Sep. 30, 2019, which claims benefit to JP 2019-176857 filed on Sep. 27, 2019 and JP 2018-186940 filed Oct. 1, 2018, the entire disclosure of each of which are incorporated herein in their entirety by reference.

BACKGROUND

Field

The present disclosure relates to a cell culture tool and a method for producing a cell culture tool.

Prior Art

When a cultured cell mass is processed into a desired shape, the cultured cell mass is subjected to treatment such as cutting the cultured cell mass into a desired shape, or a cell culture tool is processed in advance so that the cultured cell mass has a desired shape (see JP H03-007576 A).

In the production method of JP H03-007576 A, the surface of the cell culture tool is patterned to process the cell culture tool by photolithography so that the cell mass after culturing has a desired shape. However, when photolithography is performed, various manufacturing facilities such as a photomask forming apparatus, an exposure apparatus, and the like are required.

SUMMARY

Hence, the present disclosure provides a cell culture tool that can be produced in a simple facility and with which a cell mass having a desired shape can be obtained.

In order to achieve the aforementioned object, a cell culture tool (hereinafter also referred to as "culture tool") is provided to include: a cell culture base layer that contains a cell culture base.

The cell culture base layer has a cell adhesive area to which a cell is adherable and a cell adhesion inhibitory area where cell adhesion is inhibited. The cell adhesion inhibitory area includes a modified product of the cell culture base.

A method for producing a cell culture tool (hereinafter also referred to as "production method") is also provided to include: irradiating a cell culture tool including a cell culture base layer that includes a cell culture base with light to denature the cell culture base and form a cell adhesion inhibitory area.

The cell culture tool can be produced in a simple facility, and with the cell culture tool, a cell mass having a desired shape can be obtained.

BRIEF DESCRIPTION OF DRAWINGS

FIG. 1A is a schematic perspective view of the culture tool according to the first embodiment. FIG. 1B is a schematic cross-sectional view of the culture tool according to the first embodiment as viewed from line I-I of FIG. 1A. FIG. 1C is a plan view of the culture tool according to the first embodiment.

FIG. 3A is a schematic perspective view of the culture tool according to the second embodiment. FIG. 3B is a schematic cross-sectional view of the culture tool according to the second embodiment as viewed from line II-II of FIG. 3A. FIG. 3C is a plan view of the culture tool according to the second embodiment.

FIG. 5A is a schematic perspective view of the culture tool according to the third embodiment. FIG. 5B is a schematic cross-sectional view of the culture tool according to the third embodiment as viewed from line II-II of FIG. 5A. FIG. 5C is a plan view of the culture tool according to the third embodiment.

FIG. 7A is a schematic perspective view of the culture tool according to the fourth embodiment. FIG. 7B is a schematic cross-sectional view of the culture tool according to the fourth embodiment as viewed from line II-II of FIG. 7A. FIG. 7C is a plan view of the culture tool according to the fourth embodiment.

FIG. 9A is a schematic perspective view of another example of the culture tool according to fourth embodiment. FIG. 9B is a schematic cross-sectional view of another example of the culture tool according to the fourth embodiment as viewed from line II-II of FIG. 9A. FIG. 9C is a plan view of another example of the culture tool according to the fourth embodiment.

FIGS. 11A to 11C are photographs of cells after culturing in Example 1.

FIGS. 13A and 13B are photographs each showing a temperature distribution in an area irradiated with a laser beam in Example 2.

FIG. 15A is a photograph of an image of the entire surface of a dish. FIG. 15B is an enlarged photograph.

FIG. 16A is a schematic view illustrating an area of the cell culture tool irradiated with a laser beam. FIG. 16B is a photograph showing the cells in the entire culture tool after culturing. FIG. 16C is an enlarged photograph of the central area of the culture tool in the photograph of FIG. 16B.

FIG. 17A is a schematic diagram illustrating an area of the cell culture tool irradiated with a laser beam. FIG. 17B is a photograph showing the cells after culturing.

DETAILED DESCRIPTION

Figure 1A:
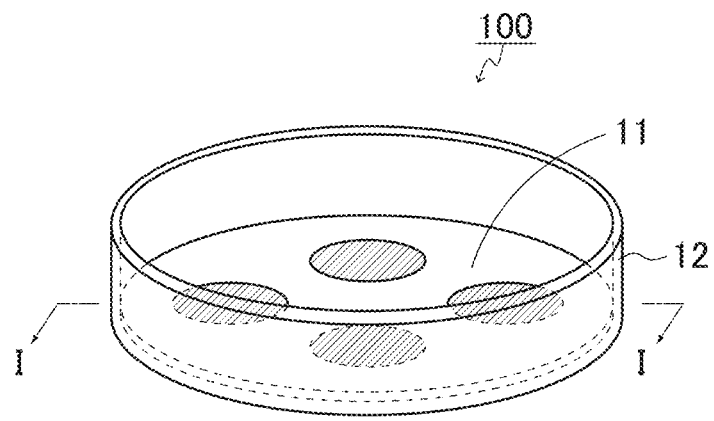
FIGS. 1A to 1C are schematic views illustrating an example of the configuration of a culture tool according to the first embodiment.

In the present disclosure, "cell" means, for example, an isolated cell or a cell mass, tissue, or organ composed of cell. The cell may be, for example, a cultured cell or a cell isolated from a living body. The cell mass, tissue, or organ may be, for example, a cell mass, cell sheet, tissue, or organ produced from the cell, or may be a cell mass, tissue, or organ isolated from a living body. The cell can be a cell that dependently adheres to an extracellular matrix.

The following describes the cell culture tool and the method for producing the cell culture tool in details with reference to the drawings. The present invention, however, is not limited thereby. In FIGS. 1 to 17 described below, the same portions are denoted by the same reference numerals, and description thereof may be omitted. In addition, in the drawings, for convenience of description, the structure of each portion may be shown in a simplified manner as appropriate, and the dimensional ratio and the like of each portion may be schematically shown differently from actual ones. Unless otherwise indicated, each embodiment may be described with reference to the description of the other embodiments.

First Embodiment

Figure 1B:
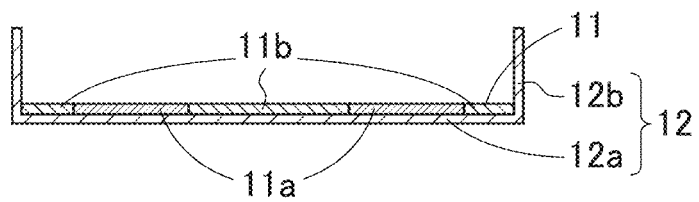
Figure 1C:
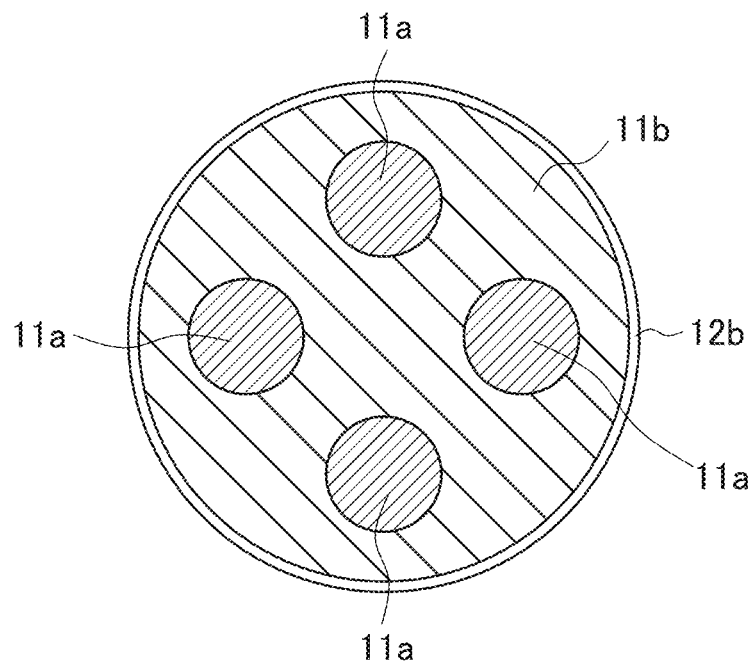

The present embodiment shows an example of a cell culture tool and an example of a method for producing the cell culture tool. FIGS. 1A to 1C are schematic views illustrating the configuration of a culture tool 100 according to the first embodiment. FIG. 1A is a schematic perspective view of the culture tool 100 according to the first embodiment. FIG. 1B is a schematic cross-sectional view of the culture tool 100 according to the first embodiment as viewed from line I-I of FIG. 1A. FIG. 1C is a plan view of the culture tool 100 according to the first embodiment. As shown in FIGS. 1A to 1C, the culture tool 100 includes a cell culture base layer 11 and a vessel 12. The cell culture base layer 11 includes a cell adhesive area 11a to which cells are adherable and a cell adhesion inhibitory area 11b where cell adhesion is inhibited. In cell culture base layer 11, the cell adhesive area 11a is formed as four substantially circular areas. In the cell culture base layer 11, the cell adhesion inhibitory area 11b is formed as an area other than the cell adhesive areas 11a. The vessel 12 includes a bottom surface 12a and a side wall 12b. The cell culture base layer 11 is stacked on the bottom surface 12a.

The cell culture base layer 11 is a layer containing a cell culture base. The cell culture base means, for example, a substance that becomes an anchorage of cells when cells are cultured. The cell culture base means, for example, an extracellular matrix or a substance having a function as an anchorage of cells. Examples of the extracellular matrix include elastin; entactin; collagens such as type I collagen, type II collagen, type III collagen, type IV collagen, type V collagen, and type VII collagen; tenascin; fibrillin; fibronectin; laminin; vitronectin; proteoglycan composed of sulfated glycosaminoglycans such as chondroitin sulfate, heparan sulfate, keratan sulfate, and dermatan sulfate and core proteins; glycosaminoglycan such as chondroitin sulfate, heparan sulfate, keratan sulfate, dermatan sulfate, and hyaluronic acid; Synthemax® (vitronectin derivative), and Matrigel® (mixtures of laminin, type IV collagen, heparin sulfate proteoglycan, and entactin/nidogen). The extracellular matrix can be laminin Examples of the laminin include laminin 111, laminin 121, laminin 211, laminin 213, laminin 222, laminin 311 (laminin 3A11), laminin 332 (laminin 3A32), laminin 321 (laminin 3A21), laminin 3B32, laminin 411, laminin 421, laminin 423, laminin 521, laminin 522, and laminin 523. Note that the three numbers in each laminin are the names of the constituent subunits of the α chain, β chain, and γ chain from the head, respectively. As a specific example, laminin 111 is composed of an α1 chain, a β1 chain, and a γ1 chain. The laminin 3A11 is composed of an α3A chain, a β1 chain, and a γ1 chain. The cell culture base may contain a peptide fragment of the protein or a fragment of the sugar chain. As a specific example, peptide fragments of the protein include, for example, fragments of laminin. Examples of the laminin fragments include the aforementioned fragments of laminin Specific examples of the fragments of laminin include laminin 211-E8, laminin 311-E8, laminin 411-E8, and laminin 511-E8. The laminin 211-E8 is composed of fragments of the α2 chain, β1 chain, and γ1 chain of laminin. The laminin 311-E8 is composed of fragments of the α3 chain, β1 chain, and γ1 chain of laminin. The laminin 411-E8 is composed of fragments of the α4 chain, β1 chain, and γ1 chain of laminin. The laminin 511-E8 is composed of, for example, fragments of the α5 chain, β1 chain, and γ1 chain of laminin.

The cell culture base is denatured directly or indirectly by light irradiation. The direct denaturation occurs, for example, by changing the structure of the cell culture base by the light irradiation. The indirect denaturation is caused, for example, by the fact that the irradiated light is converted into other energy, and the structure of the cell culture base is changed by the other energy. The other energy is, for example, heat. In this case, the cell culture base is denatured by heat generated by the light irradiation.

The culture tool 100 according to the first embodiment includes a single cell culture base layer 11 and may include cell culture base layers 11. In this case, it is preferred that the cell culture base layer 11 forming the contact surface (upper side in FIG. 1A) with cells includes cell adhesive areas 11a and a cell adhesion inhibitory area 11b.

The cell culture base layer 11 may further contain other components in addition to the cell culture base. Examples of the other components include buffers, salts, growth factors (cell growth factors), cytokines, and hormones.

In the culture tool 100 according to the present embodiment, the cell culture base layer 11 is disposed (formed) on only the upper surface of the bottom surface 12a. However, the present invention is not limited thereto. The cell culture base layer 11 may be disposed, for example, in an area that can be in contact with the cells, and may be disposed on the inner peripheral surface of the side wall 12b instead of or in addition to the upper surface of the bottom surface 12a in the culture tool 100. In addition, the cell culture base layer 11 may be formed in a part of an area that can be in contact with the cells, or may be formed in the entire area that can be in contact with the cells. In the former, the cell culture base layer 11 can be formed on the bottom surface 12a of the vessel 12.

The cell adhesive area 11a is an area to which the cells are adherable in the cell culture base layer 11. The cell culture base is adherable to the cells, for example, in a native state.

For this reason, the cell adhesive area 11*a* can also be referred to as an area containing the cell culture base in a native state, i.e., an area containing a native cell culture base. The cell culture base contained in the cell adhesive area 11*a* is partially or entirely in a native state. In the case where the cell culture base is partially in a native state, for example, at least 50%, 60%, 70%, 75%, 80%, 85%, 90%, 95%, 96%, 97%, 98%, or 99% of the cell culture base in the cell adhesive area 11*a* is in a native state. The proportion of the cell culture base in a native state or a denatured state in the cell culture base can be determined by a change in band position through native polyacrylamide gel electrophoresis (native PAGE) of a collection obtained by collecting a cell adhesive area 11*a*. The cell adhesive area 11*a* can also be referred to as, for example, an area not irradiated with light in the production method to be described later. In the present embodiment, the cell culture base is denatured directly or indirectly by light irradiation, and the adhesion with the cells is lowered. Therefore, the cell adhesive area 11*a* contains a cell culture base in a native state. However, the present invention is not limited to this, and the cell culture base in a native state may be prevented from adhering to cells, and adhesion with the cells is improved by directly or indirectly denaturing the cell culture base through light irradiation. In this case, the cell adhesive area 11*a* contains a cell culture base in a denatured state. The cell culture base denatured directly or indirectly by light irradiation is adherable to the cells.

In the present embodiment, each cell adhesive area 11*a* is formed as a substantially circular area in the cell culture base layer 11. The present invention, however, is not limited thereby. Each cell adhesive area 11*a* may have any shape and can be configured, as appropriate, according to the shape required by the user. In present embodiment, the number of the cell adhesive areas 11*a* formed in the cell culture base layer 11 is four. However, the present invention is not limited thereto. The number of the cell adhesive areas 11*a* may be one or may be two or more.

The cell adhesion inhibitory area 11*b* is an area where adhesion of the cells is inhibited. As mentioned above, the cell culture base is adherable to the cells in a native state. For this reason, the cell adhesion inhibitory area 11*b* can also be referred to as an area containing the cell culture base in a denatured state, i.e., an area containing a denatured product of the cell culture base. Examples of the denatured product include photolytes and heat-denatured products. The cell culture base contained in the cell adhesion inhibitory area 11*b* is partially or entirely in a denatured state. When the cell culture base is partially in a denatured state, for example, at least 50%, 60%, 70%, 75%, 80%, 85%, 90%, 95%, 96%, 97%, 98%, or 99% of the cell culture base in the cell adhesion inhibitory area 11*b* is in a denatured state. The cell adhesion inhibitory area 11*b* can also be referred to as an area irradiated with light in the production method to be described later. The cell adhesion inhibitory area 11*b* is an area where adhesion of cells is lowered as compared with the cell adhesive area 11*a*, for example Specifically, for example, a reduction in the number of cells adhering to the cell adhesion inhibitory area 11*b* per unit area is by 30%, 40%, 50%, 60%, 70%, 75%, 80%, 85%, 90%, 95%, 96%, 97%, 98%, or 99% or more, such as by 100%, compared to the number of cells adhering to the cell adhesive areas 11*a* per unit area. The number of adhering cells per unit area is obtained by, for example, a test in which conditions other than the state of the cell culture base in each area are the same. The cells to be used in the test can be inducted pluripotent stem cells (iPS cells). In this case, the culture conditions in the test are conditions under which the iPS cells remain undifferentiated. In the present embodiment, the cell culture base is denatured directly or indirectly by light irradiation, and the adhesion with the cells is lowered. Therefore, the cell adhesion inhibitory area 11*b* contains a cell culture base in a denatured state. However, the present invention is not limited to this, and the cell culture base in a native state may be prevented from adhering to cells, and adhesion with the cells is improved by directly or indirectly denaturing the cell culture base through light irradiation. In this case, the cell adhesion inhibitory area 11*b* contains a cell culture base in a native state. In addition, the cell culture base inhibits adhesion of cells in the state of performing no light irradiation.

In the vessel 12, the cells can be cultured. In the vessel 12, a space surrounded by the bottom surface 12*a* and the side wall 12*b* is an area where the cells can be cultured (cell culture area) and may also be referred to as a well, for example. The vessel 12 can be a cell culture vessel, and specific examples thereof includes a dish, a plate, a flask (cell culture flask), and the like. The size, volume, material, presence or absence of the adhesive treatment, and the like of the vessel 12 can be appropriately determined in accordance with the type and amount of the cells to be cultured in the culture tool 100.

The vessel 12 has one cell culture area but may have cell culture areas. In the latter case, the vessel 12 can also be said to have wells, for example. In the latter case, the cell culture base layer 11 may be formed in any one of or some of the cell culture areas, or the cell culture base layers 11 may be formed in all of the cell culture areas. That is, in the vessel 12, the cell culture base layer 11 may be formed in any one or more of wells or all of wells.

When the culture tool 100 is subjected to an observation by an optical microscope or the like, it is preferred that the culture tool forms a cell adhesion inhibitory area 11*b* on the outer peripheral portion of the bottom surface 12*a*, i.e., on the side wall 12*b* side of the bottom surface 12*a* as in the culture tool 100 according to the first embodiment. It is more preferred that a cell adhesion inhibitory area 11*b* is formed in an area where an appropriate observation image is not obtained (e.g., area where meniscus is generated) on the outer peripheral portion when observed by an optical microscope or the like. By forming a cell adhesion inhibitory area 11*b* at such a location, seeded cells can be prevented from being differentiated into unintended cells in the area where an appropriate observation image is not obtained by an optical microscope or the like when cells are cultured using the culture tool 100. Therefore, the culture tool 100 can easily control cells, for example.

In the present embodiment, the vessel 12 may include a lid. The lid may detachably cover, for example, the top surface of the vessel 12. The lid is disposed so as to face the bottom surface 12*a*, for example. The lid may be, for example, a lid of the cell culture vessel.

In the present embodiment, the cell culture base layer 11 of the culture tool 100 includes cell adhesive areas 11*a* and a cell adhesion inhibitory area 11*b* but may include only a cell adhesive area 11*a* or only a cell adhesion inhibitory area 11*b*.

The method for culturing cells using the culture tool 100 according to the present embodiment can be carried out by, for example, a known culturing method according to the type of the cells. The culture conditions, culture medium, and the like in the culturing method can be appropriately determined according to the type of the cells.

Next, a method for producing a culture tool 100 is described with reference to FIGS. 2A to 2D. FIGS. 2A to 2E are schematic views illustrating an example of the method for producing the culture tool 100. In the method for producing the culture tool 100 according to the present embodiment, a cell culture base layer 11 is formed using a native cell culture base. In the production method according to the present embodiment, a cell adhesion inhibitory area 11b is formed by irradiating the formed cell culture base layer 11 with light.

Figure 2A:
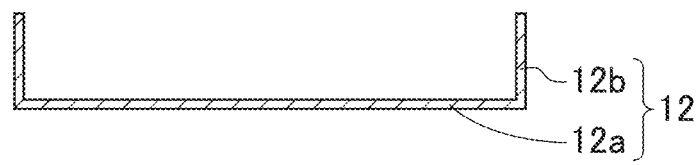
FIGS. 2A to 2D are schematic views illustrating an example of the method for producing a culture tool according to the first embodiment.

First, in the production method according to the present embodiment, as shown in FIG. 2A, a vessel 12 is prepared (preparing step). The vessel 12 may be purchased commercially or prepared in-house.

Figure 2B:
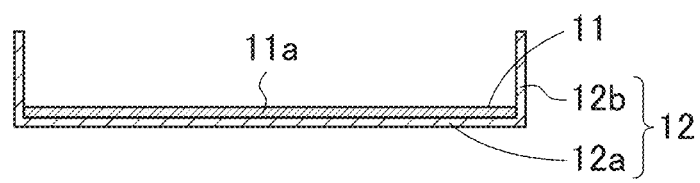

Next, in the production method according to the present embodiment, as shown in FIG. 2B, a cell culture base layer 11 containing a cell culture base is formed on a bottom surface 12a of the vessel 12 (base layer forming step). In this manner, in the production method according to the present embodiment, a vessel 12 including a cell culture base layer 11 can be prepared. In the production method according to the present embodiment, the cell culture base used in formation of the cell culture base layer 11 is in a native state. The cell culture base in a native state is adherable to cells. Therefore, as shown in FIG. 2B, the formed cell culture base layer 11 is includes a cell adhesive area 11a. The cell culture base layer 11 can be formed by, for example, a known film formation method, and specific examples of the known film formation method include an application, printing (screening), vapor deposition, sputtering, casting, and spin coating. The method for forming a cell culture base layer 11 in the case where the cell culture base is a biopolymer such as a protein can be application for the reason that denaturation of the cell culture base can be prevented. In this case, the cell culture base layer 11 may be formed, for example, by introducing a solvent containing a native cell culture base into a vessel 12, more specifically in contact with the bottom surface 12a of the vessel 12 and allowing the vessel 12 to stand still. The solvent can be, for example, an aqueous solvent, such as water. The standing time is, for example, 30 minutes to one day. The temperature at the time of standing is, for example, 4° C. to 40° C. The standing time is, for example, one hour or more, and the temperature at the time of the standing is about 37° C. (35° C. to 37° C.) when the cell culture base is laminin 511-E8, and the concentration of the cell culture base for coating is 0.5 μg/cm². In the base layer forming step, the solvent containing the native cell culture base is removed after the standing. After the solvent is removed, the inside of the vessel 12 may be washed with a solvent containing no cell culture base.

Figure 2C:
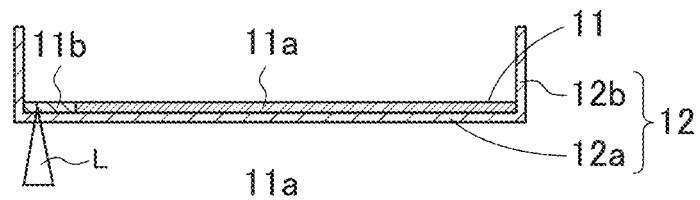

Next, in the production method according to the present embodiment, as shown in FIG. 2C, the vessel 12 (cell culture tool) including the cell culture base layer 11 is irradiated with light L to denature the cell culture base, thereby forming a cell adhesion inhibitory area 11b (inhibitory area forming step). More specifically, in the inhibitory area forming step, the cell culture base layer 11 is irradiated with light L to denature the cell culture base, thereby forming a cell adhesion inhibitory area 11b. The light L can be controlled so as to be focused on the cell culture base layer 11. In the inhibitory area forming step, it is preferred that the solvent is present on the cell culture base layer 11. In the production method according to the present embodiment, the cell culture base is adherable to the cells, for example, in a native state. Therefore, an area where a cell adhesion inhibitory area 11b is formed is irradiated with light L. The wavelength of the light L is, for example, in the wavelength of ultraviolet light (e.g., 10 to 360 nm or 10 to 340 nm), the wavelength of visible light (e.g., 360 to 760 nm or 380 to 740 nm), or the wavelength of infrared light (e.g., 760 nm to 1000 μm or 780 to 1000 μm). As a specific example, when the cell culture base is laminin 511-E8, and water is placed on the cell culture base layer 11, light L is, for example, infrared light, such as light at a wavelength at which water absorbs the light or light in a wavelength region in which water absorbs the light in infrared light. The wavelength absorbed by water is, for example, 1470 nm. The cell adhesion inhibitory area 11b can be formed precisely by a laser beam. Thus, the light can be a laser beam. The spot diameter (beam width) of light L can be set appropriately according to the energy amount of light L, for example. When the energy amount of light L is relatively small, the spot diameter is set to be relatively small, and when the energy amount of light L is relatively large, the spot diameter is set to be relatively large. The spot diameter of light L is, for example, 10 to 200 μm. The energy amount (output) of light L is, for example, an energy amount by which the cell culture base material in an area of the cell culture base layer 11 irradiated with light L is denatured, and can be appropriately set according to the type of the cell culture base material. The energy amount of light L can be an energy amount at a temperature at which the cells to be placed on the cell culture base layer 11 die. As a specific example, the energy amount of light L is an energy amount in which the temperature of the cell culture base layer in an area of the cell culture base layer 11 to be irradiated with light L is 50° C. or more, 60° C. or more, 70° C. or more, 80° C. or more, or 90° C. or more, such as 100° C. or more, 110° C. or more, or 120° C. or more. The upper limit of the temperature is, for example, 200° C. The temperature of the cell culture base can be measured, for example, according to the method of Example 2 to be described later. The scanning speed of light L can be appropriately set according to, for example, the spot diameter and the energy amount of light L. When the energy amount of light per unit area of the spot diameter is relatively low, the scanning speed of light L is set relatively low, and when the energy amount of light per unit area of the spot diameter is relatively high, the scanning speed of light L is set relatively high. As a specific example, the scanning speed of light L is, for example, 100 mm/sec or less. When light L is an infrared laser (1450 nm), the spot diameter is 75 μm. When the scanning speed of light L is 5 mm/sec or less, the energy amount of light L is about 0.6 W (0.4 to 0.8 W).

Figure 2D:
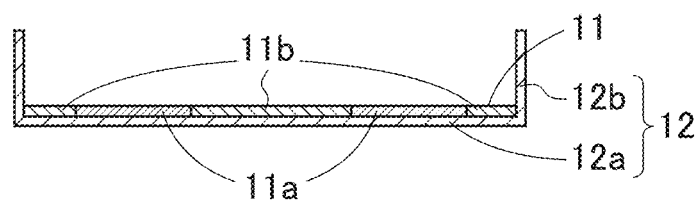

Then, in the production method according to the present embodiment, as shown in FIG. 2D, a culture tool 100 is produced. In the production method according to the present embodiment, the native cell culture base is adherable to cells. Therefore, an area where a cell adhesion inhibitory area 11b is formed is irradiated with light L. However, the present invention is not limited to this, and in the inhibitory area forming step, areas where cell adhesive areas 11a are formed may be irradiated with light L. In this case, the cell culture base in a denatured state is adherable to cells.

According to the present embodiment, the shapes and sizes (area dimensions) of the cell adhesive area 11a and the cell adhesion inhibitory area 11b in the cell culture base layer 11 can be any shapes and sizes. Therefore, with the culture tool 100 according to the present embodiment, by controlling the shapes and sizes of the cell adhesive areas 11a and the cell adhesion inhibitory area 11b, a cell mass obtained at the time of culturing cells can have a desired shape in desired size. That is, with the culture tool 100 according to the present embodiment, a cell mass having a desired shape can be obtained after culturing. The culture tool 100 according to the present embodiment can be used for obtaining a cell mass having a desired shape after culturing cells that adhere to each other depending on the extracellular matrix. The shape and size of a cell mass obtained by culturing cells are important factors of induction of differentiation of the cells. With the culture tool 100 according to the present embodiment, the shapes and sizes of the cell adhesive areas 11a and the cell adhesion inhibitory area 11b can be controlled. Thus, differentiation of cells to be cultured into desired cells can be induced. The culture tool 100 according to the present embodiment can be produced only by a light irradiation apparatus such as a laser beam irradiation apparatus. Therefore, the culture tool 100 according to the present embodiment can be produced in a simple facility. These effects are the same in each embodiment to be described later.

Second Embodiment

Figure 3A:
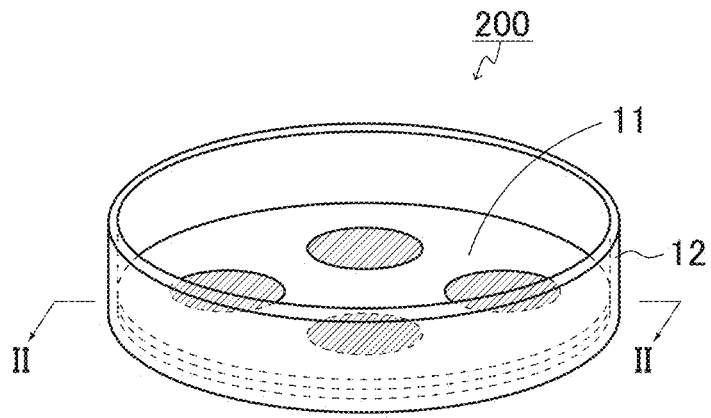
FIGS. 3A to 3C are schematic views illustrating an example of the configuration of a culture tool according to the second embodiment.
Figure 3B:
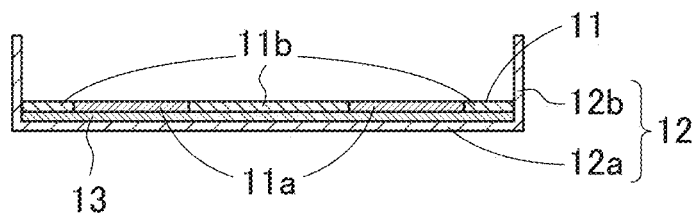
Figure 3C:
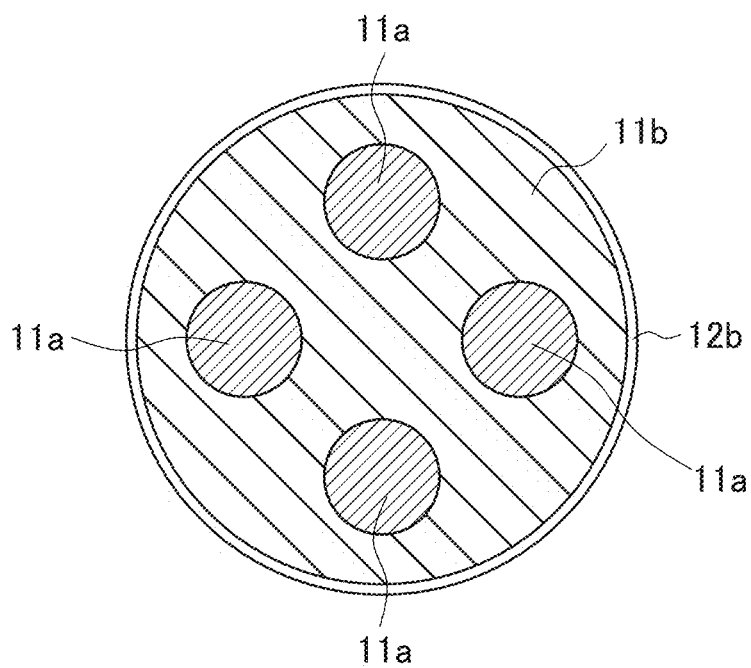

The present embodiment shows another example of the cell culture tool and the method for producing the cell culture tool. FIGS. 3A to 3C are schematic views illustrating the configuration of a culture tool 200 according to the second embodiment. FIG. 3A is a schematic perspective view of the culture tool 200. FIG. 3B is a schematic cross-sectional view of the culture tool 200 as viewed from line II-II of FIG. 3A. FIG. 3C is a plan view of the culture tool 200. As shown in FIGS. 4B-4E, the culture tool 200 includes a photo-thermal conversion layer 13 in addition to the configuration of the culture tool 100 according to the first embodiment. The photo-thermal conversion layer 13 is disposed between the cell culture base layer 11 and the bottom surface 12a. That is, the photo-thermal conversion layer 13 and the cell culture base layer 11 are stacked on the bottom surface 12a in this order. Except for this point, the configuration of the culture tool 200 according to the second embodiment is the same as that of and can be described with reference to the description of the culture tool 100 according to the first embodiment.

The photo-thermal conversion layer 13 is a layer capable of converting light into heat. The photo-thermal conversion layer 13 contains, for example, a molecule capable of converting light into heat (photo-thermal conversion molecule). The photo-thermal conversion molecule can be formed of a polymer containing a dye structure (chromophore) which absorbs light L at a wavelength for irradiation in the method for producing the culture vessel 200 to be described later. The photo-thermal conversion molecule can be a molecule that can be easily applied to the vessel 12 to coat. Examples of the dye structure that absorbs light L include derivatives of organic compounds such as azobenzene, diarylethene, spiropyran, spirooxazine, fulgide, a leuco dye, indigo, carotenoid (carotene, etc.), flavonoid (anthocyanin, etc.), quinoid (anthraquinone, etc.), and the like. Examples of the skeleton composing the polymer include an acrylic polymer, a polystyrene polymer, a polyolefin polymer, polyvinyl acetate, polyvinyl chloride, a polyolefin polymer, a polycarbonate polymer, and an epoxy polymer. As a specific example, the photo-thermal conversion molecule can be, for example, poly[methylmethacrylate-co-(disperse yellow-7-methacrylate)] $((C_5H_8O_2)_m(C_{23}H_{20}N_4O_2)_n)$ represented by the following formula (1). In the following formula (1), as the structure of azobenzene in the polymer, any of various structures modified with a nitro group, an amino group, a methyl group, or the like may be employed in addition to unsubstituted azobenzene. In the following formula (1), m and n are represented by percentages by mole. The sum of m and n is, for example, 100 mol %. For example, m and n may be the same as or different from each other. The photo-thermal conversion layer 13 may contain one kind of photo-thermal conversion molecule or a plurality of kinds of photo-thermal conversion molecules, for example.

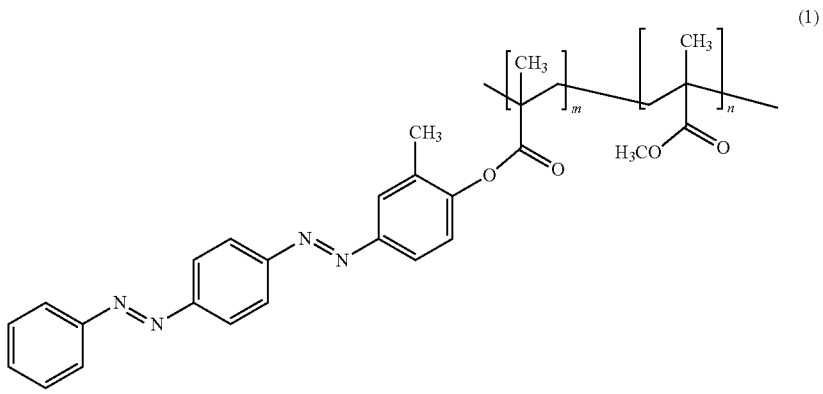

(1)

The culture tool 200 according to the second embodiment includes a single photo-thermal conversion layer 13 and may include photo-thermal conversion layers 13. In this case, it is preferred that photo-thermal conversion layers 13 are disposed between the cell culture base layer 11 and the bottom surface 12a. In the culture tool 200 according to the second embodiment, the photo-thermal conversion layer 13 is disposed to be in contact with the cell culture base layer 11, but may be disposed not to be in contact with the cell culture base layer 11. In this case, the photo-thermal conversion layer 13 and the cell culture base layer 11 may be thermally connected to each other. Specifically, a heat conductive layer for conducting heat generated in the photo-thermal conversion layer 13 to the cell culture base layer 11 is formed between the photo-thermal conversion layer 13 and the cell culture base layer 11. The thermally conductive layer contains a molecule having high thermal conductivity such as a metal, for example.

The photo-thermal conversion layer 13 may further contain other components in addition to the photo-thermal conversion molecule. Examples of the other components include a curing agent of a polymer, an unpolymerized monomer, and the like.

In the culture tool 200 according to the present embodiment, the photo-thermal conversion layer 13 is disposed (formed) on only the upper surface of the bottom surface 12a. However, the present invention is not limited thereto. The photo-thermal conversion layer 13 may be disposed adjacent to the cell culture base layer 11, for example, and may be formed in the vessel 12, for example. In this case, the photo-thermal conversion layer 13 can be formed on an upper surface of the bottom surface of the vessel 12.

In the culture tool 200 according to the present embodiment, the photo-thermal conversion layer 13 is disposed (formed) on only the upper surface of the bottom surface 12a. However, the present invention is not limited thereto. For example, as long as the photo-thermal conversion layer 13 is thermally connected to the cell culture base layer 11, the photo-thermal conversion layer 13 may be disposed on the inner peripheral surface of the side wall 12b in addition to or as a substitute for the upper surface of the bottom surface 12a in the culture tool 200. The photo-thermal conversion layer 13 may be formed to be thermally connected to a part of the cell culture base layer 11 or the entire cell culture base layer 11. In the former, the photo-thermal conversion layer 13 can be formed on the bottom surface 12a of the vessel 12 at the time of culturing cells.

The vessel 12 has one cell culture area but may have cell culture areas. In the latter case, the vessel 12 can also be said to have wells, for example. In the latter case, the cell culture base layer 11 and the photo-thermal conversion layer 13 may be formed in any one of or some of the cell culture areas, or the cell culture base layer 11 and the photo-thermal conversion layer 13 may be formed in all of the cell culture areas. That is, in the vessel 12, the cell culture base layer 11 and the photo-thermal conversion layer 13 may be formed in any one or more of wells or all of wells.

In the present embodiment, the cell culture base layer 11 of the culture tool 200 includes cell adhesive areas 11a and a cell adhesion inhibitory area 11b but may be formed of only the cell adhesive area 11a or only the cell adhesion inhibitory area 11b.

Next, a method for producing a culture tool 200 is described with reference to FIGS. 4A to 4E. FIGS. 4A to 4E are schematic views illustrating an example of the method for producing the culture tool 200. In the method for producing the culture tool 200 according to the present embodiment, a cell culture base layer 11 is formed on a photo-thermal conversion layer 13 using a native cell culture base. In the production method according to the present embodiment, the photo-thermal conversion layer 13 is irradiated with light, so that light is converted into heat by the photo-thermal conversion layer 13. Therefore, in the production method according to the present embodiment, by heat generated in the photo-thermal conversion layer 13, the cell culture base in the cell culture base layer 11 adjacent to an area where the heat is generated is denatured, thereby forming a cell adhesion inhibitory area 11b.

Figure 4A:
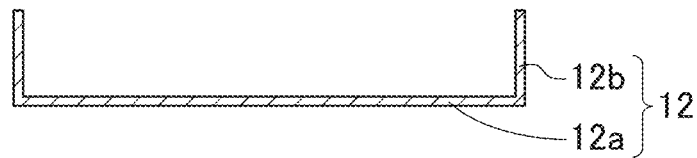
FIGS. 4A to 4E are schematic views illustrating an example of the method for producing a culture tool according to the second embodiment.

First, in the production method according to the present embodiment, as shown in FIG. 4A, a vessel 12 is provided (providing step). The vessel 12 may be purchased commercially or prepared in-house, as described above.

Figure 4B:
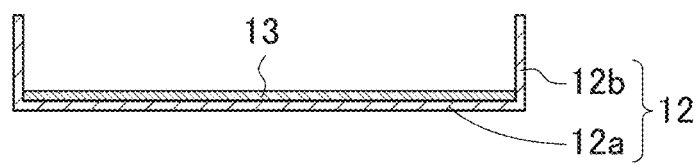

Next, in the production method according to the present embodiment, a photo-thermal conversion layer 13 containing the photo-thermal conversion molecule is formed on the bottom surface 12a of the vessel 12 as shown in FIG. 4B (conversion layer forming step). The photo-thermal conversion layer 13 can be formed by, for example, a known film formation method, and specific examples of the known film formation method include an application, printing (screening), vapor deposition, sputtering, casting, and spin coating. Specifically, the photo-thermal conversion layer 13 can be, for example, formed by introducing a raw material solution containing the dye structure-containing polymer or a raw material solution obtained by dissolving the dye structure-containing polymer in a solvent into the vessel 12, more specifically, by introducing it to be in contact with the bottom surface 12a of the vessel 12, by spin coating, casting, or the like, and curing the raw material solution. Examples of the solvent include organic solvents such as 1,2-dichloroethane and methanol.

Figure 4C:
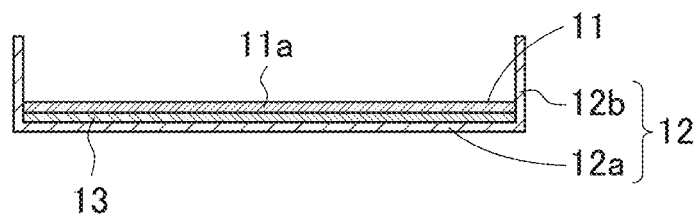

Next, in the production method according to the present embodiment, as shown in FIG. 4C, a cell culture base layer 11 containing a cell culture base is formed on a photo-thermal conversion layer 13 (base layer forming step). In this manner, in the production method according to the present embodiment, a vessel 12 including a cell culture base layer 11 and a photo-thermal conversion layer 13 can be prepared. In the production method according to the present embodiment, the cell culture base used in formation of the cell culture base layer 11 is in a native state. The cell culture base in a native state is adherable to cells. Therefore, as shown in FIG. 4C, the formed cell culture base layer 11 includes a cell adhesive area 11a. The cell culture base layer 11 can be formed by, for example, a known film formation method, and specific examples of the known film formation method include an application, printing (screening), vapor deposition, sputtering, casting, and spin coating. The method for forming a cell culture base layer 11 in the case where the cell culture base is a biopolymer such as a protein can be application for the reason that denaturation of the cell culture base can be prevented. In this case, the cell culture base layer 11 may be formed, for example, by introducing a solvent containing a native cell culture base into a vessel 12 and allowing the vessel 12 to stand still. The solvent can be, for example, an aqueous solvent, such as water. The standing time, the temperature, and the like of the solvent containing native cell culture base can be described with reference to the description according to the first embodiment. In the base layer forming step, the solvent containing the native cell culture base is removed after the standing. After the solvent is removed, the inside of the vessel 12 may be washed with a solvent containing no cell culture base.

Figure 4D:
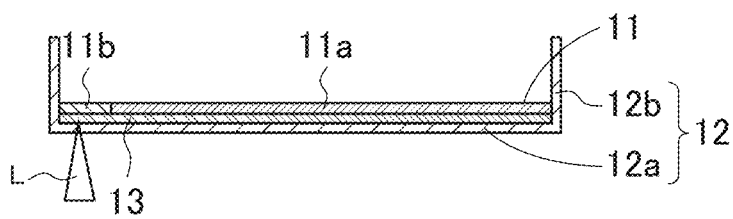

Next, in the production method according to the present embodiment, as shown in FIG. 4D, the vessel 12 (cell culture tool) including the cell culture base layer 11 and the photo-thermal conversion layer 13 is irradiated with light L to denature the cell culture base, thereby forming a cell adhesion inhibitory area 11b (inhibitory area forming step). In the inhibitory area forming step, specifically, the photo-thermal conversion layer 13 is irradiated with light L, more specifically, the photo-thermal conversion layer 13 is irradiated with light L in a focused state. The photo-thermal conversion layer 13 contains, as mentioned above, a molecule capable of converting light into heat. Therefore, the photo-thermal conversion layer 13 irradiated with light converts the light energy of the light L into thermal energy. Then, the temperature of an area of the photo-thermal conversion layer 13 irradiated with light L is increased, and the temperature of an area of the cell culture base layer 11 adjacent to the area irradiated with light L is increased, and the structure of the cell culture base in the cell culture base layer 11 changes. Thus, in the inhibitory area forming step, the cell culture base is denatured to form a cell adhesion inhibitory area 11b. The light L can be controlled so as to be focused on the photo-thermal conversion layer 13. In the inhibitory area forming step, it is preferred that the solvent is present on the cell culture base layer 11. In the production method according to the present embodiment, the cell culture base is adherable to the cells, for example, in a native state. Therefore, an area of the photo-thermal conversion layer 13 corresponding (adjacent) to an area where a cell adhesion inhibitory area 11*b* is formed is irradiated with light L. More specifically, in FIG. 4E, a corresponding area of the photo-thermal conversion layer 13, present immediately below an area where a cell adhesion inhibitory area 11*b* is formed is irradiated with light L.

The wavelength of light L can be set, as appropriate, according to the absorption wavelength of a photo-thermal conversion molecule contained in the photo-thermal conversion layer 13. The wavelength of the light L is, for example, the wavelength of ultraviolet light, visible light, or infrared light. As a specific example, in the case of the polymer of the formula (1), the wavelength of light L is, for example, 390 to 420 nm. The cell adhesion inhibitory area 11*b* can be formed precisely by a laser beam. Thus, the light can be a laser beam. The spot diameter (beam width) of light L can be appropriately set according to the energy amount of light L, for example, and when the energy amount of light L is relatively small, the spot diameter is set relatively small, and when the energy amount of light L is relatively large, the spot diameter is set relatively large. The spot diameter of light L is, for example, 10 to 200 μm. The energy amount (output) of the light L is, for example, an energy amount by which the cell culture base of the cell culture base layer 11 is denatured, corresponding to (adjacent to) an area of the photo-thermal conversion layer 13 irradiated with light L and can be set appropriately according to the type of the cell culture base and the type of the photo-thermal conversion molecule. The energy amount of light L can be an energy amount at a temperature at which the cells to be placed on the cell culture base layer 11 die. As a specific example, the energy amount of light L is an energy amount in which the temperature of the cell culture base layer in a part of the cell culture base layer 11 to be irradiated with light L is 50° C. or more, 60° C. or more, 70° C. or more, 80° C. or more, or 90° C. or more, such as 100° C. or more, 110° C. or more, or 120° C. or more. The upper limit of the temperature is, for example, 200° C. In the inhibitory area forming step, the photo-thermal conversion layer 13 may be irradiated with light L such that the temperature of the photo-thermal conversion layer 13 becomes, for example, any of examples of the temperature of the cell culture base. The scanning speed of light L can be appropriately set according to, for example, the spot diameter and the energy amount of light L. When the energy amount of light L per unit area of the spot diameter is relatively low, the scanning speed of light L is set relatively low, and when the energy amount of light per unit area of the spot diameter is relatively high, the scanning speed of light L is set relatively high. As a specific example, the scanning speed of light L is, for example, 100 mm/sec or less. When the light L is a visible-light laser (405 nm), the spot diameter is 45 and the scanning speed of the light L is 80 mm/sec, the energy amount of the light L is about 0.5 W (0.3 to 0.7 W).

Figure 4E:
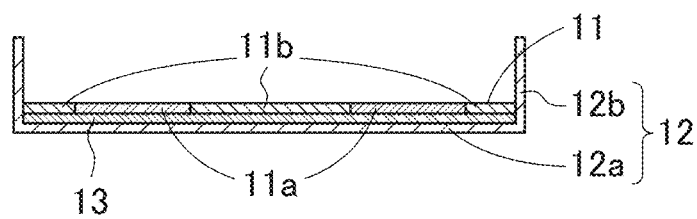

Then, in the production method according to the present embodiment, as shown in FIG. 4E, a culture tool 200 is produced. In the production method according to the present embodiment, the native cell culture base is adherable to cells. Therefore, in the inhibitory area forming step, the photo-thermal conversion layer 13 adjacent to an area where the cell adhesion inhibitory area 11*b* is formed is irradiated with light L. However, the present invention is not limited to this, and in the inhibitory area forming step, the photo-thermal conversion layer 13 adjacent to areas where cell adhesive areas 11*a* are formed may be irradiated with light L. In this case, the cell culture base in a denatured state is adherable to cells.

In the present embodiment, light energy can be efficiently converted into thermal energy by using the photo-thermal conversion layer 13. Therefore, in the present embodiment, the cell culture base in the areas adjacent to the areas of the photo-thermal conversion layer 13 irradiated with light L in the cell culture base layer 11 can be efficiently denatured. Therefore, the present embodiment can efficiently produce the culture tool 200 according to the present embodiment.

Third Embodiment

Figure 5A:
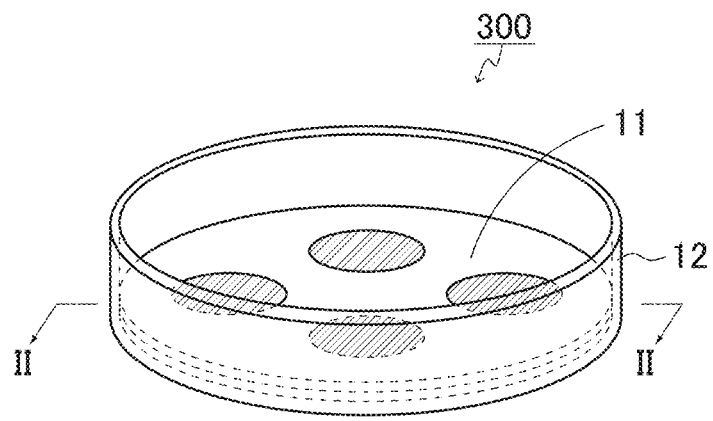
FIGS. 5A to 5C are schematic views illustrating an example of the configuration of a culture tool according to the third embodiment.
Figure 5B:
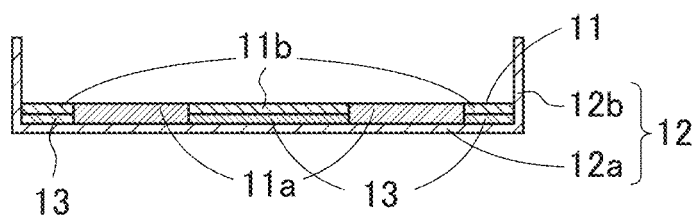
Figure 5C:
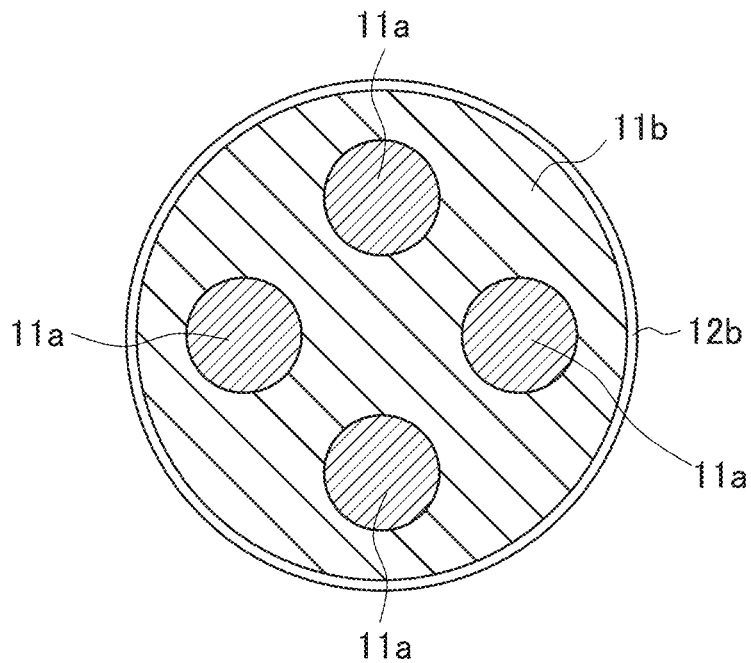

The present embodiment shows another example of the cell culture tool and the method for producing the cell culture tool. FIGS. 5A to 5C are schematic views illustrating the configuration of a culture tool 300 according to the third embodiment. FIG. 5A is a schematic perspective view of the culture tool 300. FIG. 5B is a schematic cross-sectional view of the culture tool 300 as viewed from line II-II of FIG. 5A. FIG. 5C is a plan view of the culture tool 300. As shown in FIGS. 5A to 5C, the culture tool 300 is obtained by forming photo-thermal conversion layers 13 in parts of the bottom surface 12*a* in the configuration of the culture tool 200 according to the second embodiment. In the culture tool 300, a part of each cell adhesive area 11*a* is in contact with the bottom surface 12*a*. Except for this point, the configuration of the culture tool 300 according to the third embodiment is the same as that of and can be described with reference to the description of the culture tool 200 according to the second embodiment.

Next, a method for producing a culture tool 300 is described with reference to FIGS. 6A to 6E. FIGS. 6A to 6E are schematic views illustrating an example of the method for producing the culture tool 300. In the method for producing the culture tool 300 according to the present embodiment, a photo-thermal conversion layer 13 is formed to be in contact with a part of the bottom surface 12*a* of the vessel 12. Next, a cell culture base layer 11 is formed on the photo-thermal conversion layer 13 and areas of the bottom surface 12*a* on which the photo-thermal conversion layer 13 is not formed, using a native cell culture base. In the production method according to the present embodiment, the photo-thermal conversion layer 13 is irradiated with light, so that light is converted into heat by the photo-thermal conversion layer 13. Therefore, in the production method according to the present embodiment, by heat generated in the photo-thermal conversion layer 13, the cell culture base in the cell culture base layer 11 adjacent to an area where the heat is generated is denatured, thereby forming a cell adhesion inhibitory area 11*b*.

Figure 6A:
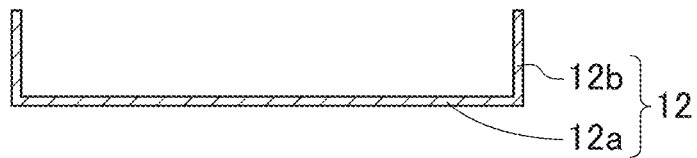
FIGS. 6A to 6E are schematic views illustrating an example of the method for producing a culture tool according to the third embodiment.

First, in the production method according to the present embodiment, as shown in FIG. 6A, a vessel 12 is prepared (preparing step). The vessel 12 may be purchased commercially or prepared in-house, as described above.

Figure 6B:
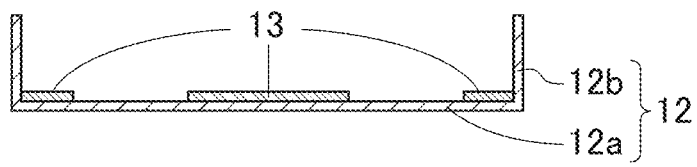

Next, in the production method according to the present embodiment, as shown in FIG. 6B, a photo-thermal conversion layer 13 containing a photo-thermal conversion molecule is formed on the bottom surface 12*a* of the vessel 12 (conversion layer forming step). In the production method according to the present embodiment, the photo-thermal conversion layer 13 is not formed on the entire surface of the bottom surface 12*a*, and the photo-thermal conversion layers 13 are formed on the respective parts of the bottom surface 12*a*. The areas where the photo-thermal conversion layers 13 are formed can be desired areas and specifically configured according to the shape of the cell adhesive area 11a. As a specific example, an area where the photo-thermal conversion layer 13 is formed can be configured to have substantially the same shape as an area which is not the cell adhesive areas 11a, i.e., which is the cell adhesion inhibitory area 11b, for example. As described above, when an area where the photo-thermal conversion layer 13 is configured to have substantially the same shape as the cell adhesion inhibitory area 11b, the cell adhesion inhibitory area 11b can be formed at a time by irradiating the entire bottom surface 12b of the vessel 12 with light L in the inhibitory area forming step to be described later, for example. Therefore, the production method according to the present embodiment can produce the culture tool 300 according to the present embodiment in a short time. A method for forming a photo-thermal conversion layer 13 can be described with reference to the description of the conversion layer forming step in the second embodiment.

Figure 6C:
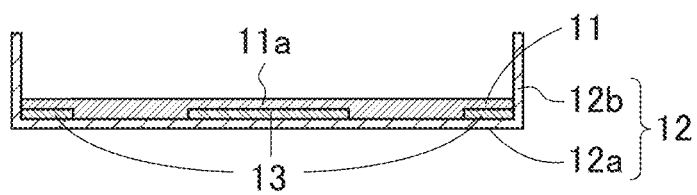

Next, in the production method according to the present embodiment, as shown in FIG. 6C, a cell culture base layer 11 containing a cell culture base is formed on a photo-thermal conversion layers 13 and a bottom surface 12a in the same manner as in the base layer forming step in the second embodiment (base layer forming step). In this manner, in the production method according to the present embodiment, a vessel 12 including a cell culture base layer 11 and a photo-thermal conversion layer 13 can be prepared.

Figure 6D:
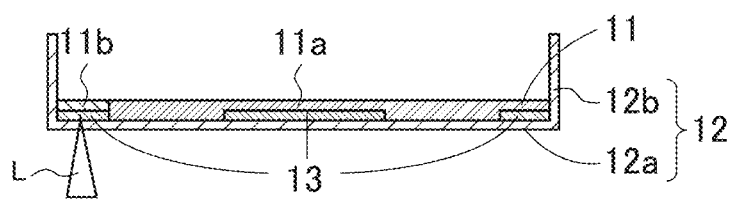

Next, in the production method according to the present embodiment, as shown in FIG. 6D, the vessel 12 (cell culture tool) including the cell culture base layer 11 and the photo-thermal conversion layer 13 is irradiated with light L to denature the cell culture base, thereby forming a cell adhesion inhibitory area 11b (inhibitory area forming step). In the inhibitory area forming step, specifically, the photo-thermal conversion layer 13 is irradiated with light L, more specifically, the photo-thermal conversion layer 13 is irradiated with light L in a focused state. The photo-thermal conversion layer 13 contains, as mentioned above, the photo-thermal conversion molecule capable of converting light into heat. Therefore, the photo-thermal conversion layer 13 irradiated with light converts the light energy of the light L into thermal energy. Then, the temperature of an area of the photo-thermal conversion layer 13 irradiated with light L is increased, and the temperature of an area of the cell culture base layer 11 adjacent to the area irradiated with light L is increased, and the structure of the cell culture base in the cell culture base layer 11 changes. Thus, in the inhibitory area forming step, the cell culture base is denatured to form a cell adhesion inhibitory area 11b. In the inhibitory area forming step, it is preferred that the solvent is present on the cell culture base layer 11. In the production method according to the present embodiment, the photo-thermal conversion layer 13 is formed to correspond to (be adjacent to) an area where the cell adhesion inhibitory area 11b is formed. Therefore, in the production method according to the present embodiment, the entire bottom surface 12a may be irradiated with light L at once, or alternatively, the entire bottom surface 12a may be irradiated by partially irradiating the bottom surface 12a with light L and changing an area to be irradiated. However, in the production method according to the present embodiment, the irradiation can be the former such that the culture tool 300 according to the present embodiment can be produced in a short time. The irradiation conditions of the light L can be described with reference to those in the second embodiment.

Figure 6E:
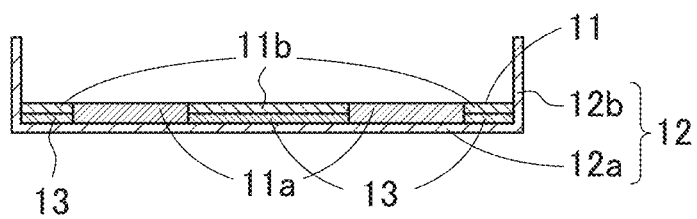

Then, in the production method according to the present embodiment, as shown in FIG. 6E, a culture tool 300 is produced. In the production method according to the present embodiment, the native cell culture base is adherable to cells. Therefore, in the inhibitory area forming step, the photo-thermal conversion layer 13 adjacent to an area where the cell adhesion inhibitory area 11b is formed is irradiated with light L. However, the present invention is not limited to this, and the photo-thermal conversion layer 13 is formed adjacent to the areas where the cell adhesive areas 11a are formed, and in the inhibitory area forming step, the photo-thermal conversion layer 13 adjacent to the areas where the cell adhesive areas 11a are formed may be irradiated with light L. In this case, the cell culture base in a denatured state is adherable to cells.

In the present embodiment, an area where the cell adhesion inhibitory area 11b is formed can be determined in advance using an area where the photo-thermal conversion layer 13 is formed. Therefore, in the present embodiment, the cell adhesion inhibitory area 11b can be formed at a time by irradiating the entire bottom surface 12a with light L in the inhibitory area forming step. Therefore, the present embodiment can produce the culture tool 300 according to the present embodiment in a short time.

Fourth Embodiment

Figure 7A:
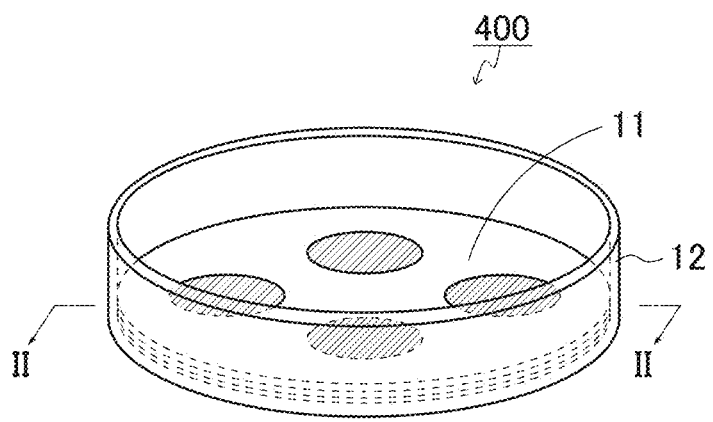
FIGS. 7A to 7C are schematic views illustrating an example of the configuration of a culture tool according to the fourth embodiment.
Figure 7B:
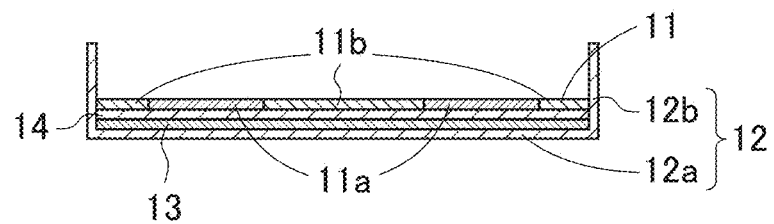
Figure 7C:
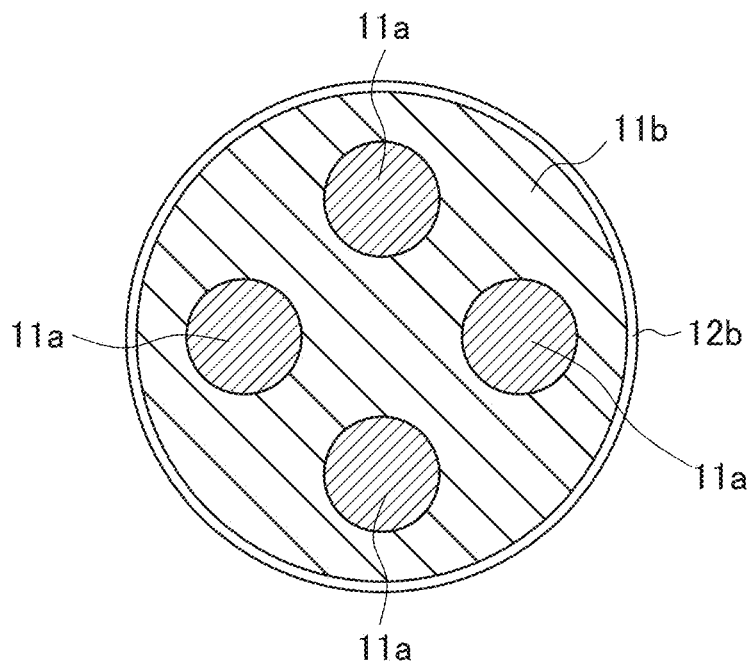

The present embodiment shows another example of the cell culture tool and the method for producing the cell culture tool. FIGS. 7A to 7C are schematic views illustrating the configuration of a culture tool 400 according to the fourth embodiment. FIG. 7A is a schematic perspective view of the culture tool 400. FIG. 7B is a schematic cross-sectional view of the culture tool 400 as viewed from line II-II of FIG. 7A. FIG. 7C is a plan view of the culture tool 400. As shown in FIGS. 7A to 7C, the culture tool 400 is obtained by forming a blocking layer 14 between the photo-thermal conversion layer 13 and the cell culture base layer 11 in the configuration of the culture tool 200 according to the second embodiment. Except for this point, the configuration of the culture tool 400 according to the fourth embodiment is the same as that of and can be described with reference to the description of the culture tool 200 according to the second embodiment. In the culture tool 400 according to the fourth embodiment, the blocking layer 14 is stacked on the photo-thermal conversion layer 13. Thus, the blocking layer 14 intervenes between the cells cultured on the cell culture base layer 11 and the photo-thermal conversion layer 13. Therefore, the culture tool 400 according to the fourth embodiment allows contact between the photo-thermal conversion layer 13 and the cells to be avoided. Accordingly, for example, the influence of the solvent used in formation of the photo-thermal conversion layer 13, a side chain (i.e., the dye structure mentioned above) that is no bonded to the photo-thermal conversion polymer, or an unpolymerized monomer on the cells can be prevented.

The blocking layer 14 blocks contact between the cell culture base layer 11 and the photo-thermal conversion layer 13. Since the blocking layer 14 can block or shield the contact between the cell culture base layer 11 and the photo-thermal conversion layer 13, the blocking layer 14 can also be referred to as a shielding layer or an isolating layer. Since the blocking layer 14 seals the photo-thermal conversion layer 13 in a space formed between the blocking layer 14 and the vessel 12, the blocking layer 14 can also be referred to as a sealing layer. Further, since the blocking layer 14 can conduct heat generated in the photo-thermal conversion layer 13 to the cell culture base layer 11, the blocking layer 14 can also be referred to as a heat conductive layer.

In the culture tool 400 according to the present embodiment, heat generated in the photo-thermal conversion layer 13 is conducted to the cell culture base layer 11 via the blocking layer 14. That is, the blocking layer 14 thermally connect between the cell culture base layer 11 and the photo-thermal conversion layer 13. Thermal connection can be achieved, for example, by adjusting the thickness of the blocking layer 14 or bringing a molecule having high thermal conductivity such as a metal to be contained in the blocking layer 14.

The blocking layer 14 can be formed of, for example, the same material as the material for forming a vessel 12. As a specific example, the blocking layer 14 can be formed of, for example, a plastic such as a polystyrene-based polymer such as polystyrene, polymethylpentene, a polycarbonate-based polymer such as polycarbonate, PET, a polypropylene-based polymer such as and polypropylene, cycloolefin polymer, a polyimide-based polymer such as and polyimide; glass; quartz; a silicone resin; a cellulose-based material; or the like.

The surface of the blocking layer 14 may be treated to improve adhesion with the cell culture base layer 11. The treatment can be, for example, a treatment for hydrophilizing the surface of the blocking layer 14 on the cell culture area side. As a specific example, the treatment can be, for example, a plasma treatment or the like.

Next, a method for producing a culture tool 400 is described with reference to FIGS. 8A to 8F. FIGS. 8A to 8F are schematic views illustrating an example of the method for producing the culture tool 400. In the method of producing the culture tool 400 according to the present embodiment, a photo-thermal conversion layer 13 is formed on a blocking layer 14 (conversion layer forming step). Next, in the method for producing the culture tool 400 according to the present embodiment, a vessel 12 including a photo-thermal conversion layer 13 and a blocking layer 14 is formed (vessel forming step). Further, in the production method according to the present embodiment, a cell culture base layer 11 is formed on a blocking layer 14 using a native cell culture base (base layer forming step). In the production method according to the present embodiment, the photo-thermal conversion layer 13 is irradiated with light, so that light is converted into heat by the photo-thermal conversion layer 13. Therefore, in the production method according to the present embodiment, heat generated in the photo-thermal conversion layer 13 is conducted to the blocking layer 14, and the cell culture base in the cell culture base layer 11 adjacent to an area where the heat is generated is denatured, thereby forming a cell adhesion inhibitory area 11b.

Figure 8A:
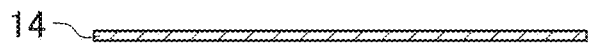
FIGS. 8A to 8F are schematic views illustrating an example of the method for producing a culture tool according to the fourth embodiment.

First, in the production method according to the present embodiment, as shown in FIG. 8A, the blocking layer 14 is prepared (blocking layer preparation step). The blocking layer 14 may be purchased commercially or prepared in-house. As the blocking layer 14, a film, a substrate, or the like can be used, for example.

Figure 8B:
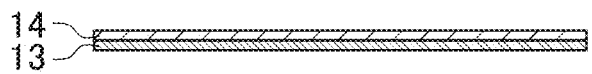

Next, in the production method according to the present embodiment, as shown in FIG. 8B, a photo-thermal conversion layer 13 containing the photo-thermal conversion molecule is formed on one surface of the blocking layer 14 (conversion layer forming step). The photo-thermal conversion layer 13 can be formed by, for example, a known film formation method, and specific examples of the known film formation method include an application, printing (screening), vapor deposition, sputtering, casting, and spin coating.

Specifically, the photo-thermal conversion layer 13 can be formed by bringing a raw material solution containing the dye structure-containing polymer or a raw material solution obtained by dissolving the dye structure-containing polymer in a solvent into contact with the blocking layer 14 by spin coating, casting, or the like, and curing the raw material solution, for example. Examples of the solvent include organic solvents such as 1,2-dichloroethane and methanol.

Figure 8C:
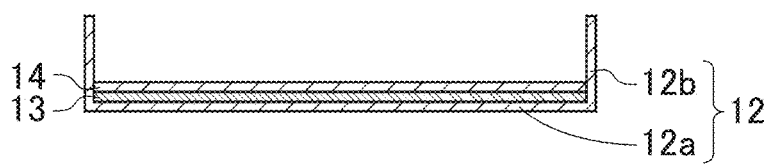

Further, in the culture tool according to the present embodiment, as shown in FIG. 8C, a vessel 12 containing a photo-thermal conversion layer 13 and a blocking layer 14 is formed (vessel forming step). The vessel forming step may be performed by disposing a laminate of the photo-thermal conversion layer 13 and the blocking layer 14 on the bottom surface of the vessel 12 or by molding a vessel 12 using the laminate of the photo-thermal conversion layer 13 and the blocking layer 14 and an injection molding such as a film insert molding, for example.

Figure 8D:
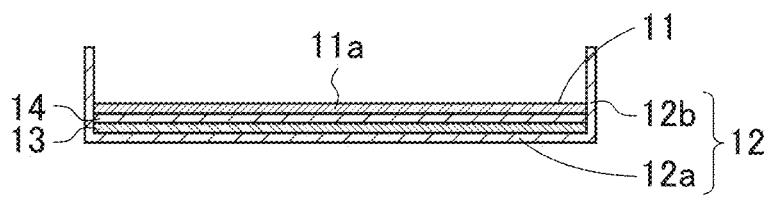

Next, in the production method according to the present embodiment, as shown in FIG. 8D, a cell culture base layer 11 containing a cell culture base is formed on a blocking layer 14 (base layer forming step). In this manner, in the production method according to the present embodiment, a vessel 12 including a cell culture base layer 11, a photo-thermal conversion layer 13, and a blocking layer 14 can be prepared. In the production method according to the present embodiment, the cell culture base used in formation of the cell culture base layer 11 is in a native state. The cell culture base in a native state is adherable to cells. Therefore, as shown in FIG. 8D, the formed cell culture base layer 11 includes a cell adhesive area 11a. The cell culture base layer 11 can be formed by, for example, a known film formation method, and specific examples of the known film formation method include an application, printing (screening), vapor deposition, sputtering, casting, and spin coating. The method for forming a cell culture base layer 11 in the case where the cell culture base is a biopolymer such as a protein can be application for the reason that denaturation of the cell culture base can be prevented. In this case, the cell culture base layer 11 may be formed, for example, by introducing a solvent containing a native cell culture base into a vessel 12 and allowing the vessel 12 to stand still. The solvent can be, for example, an aqueous solvent, such as water. For the standing time, the temperature, and the like of the solvent containing native cell culture base, the description according to the first embodiment can be referred to. In the base layer forming step, the solvent containing the native cell culture base is removed after the standing. After the solvent is removed, the inside of the vessel 12 may be washed with a solvent containing no cell culture base.

Figure 8E:
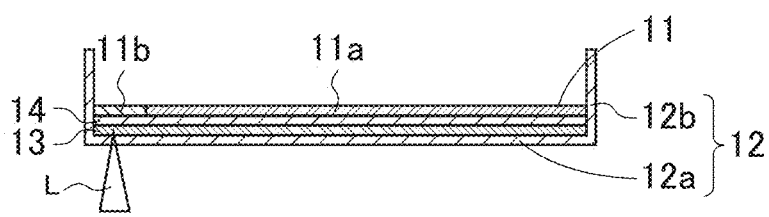

Next, in the production method according to the present embodiment, as shown in FIG. 8E, the vessel 12 (cell culture tool) including the cell culture base layer 11, the photo-thermal conversion layer 13, and the blocking layer 14 is irradiated with light L to denature the cell culture base, thereby forming a cell adhesion inhibitory area 11b (inhibitory area forming step). In the inhibitory area forming step, specifically, the photo-thermal conversion layer 13 is irradiated with light L, more specifically, the photo-thermal conversion layer 13 is irradiated with light L in a focused state. The photo-thermal conversion layer 13 contains, as mentioned above, the photo-thermal conversion molecule capable of converting light into heat. Therefore, the photo-thermal conversion layer 13 irradiated with light converts the light energy of the light L into thermal energy. Then, the temperature of the area of the photo-thermal conversion layer 13 irradiated with light L is increased, and the temperature of an area of the blocking layer 14 adjacent to the area of the photo-thermal conversion layer 13 irradiated with light L is increased. Then, the temperature of the area of the cell culture base layer 11 adjacent to the area of the blocking layer 14 at an increased temperature is increased, and the structure of the cell culture base in the cell culture base layer 11 changes. Thus, in the inhibitory area forming step, the cell culture base is denatured to form a cell adhesion inhibitory area 11b. The light L can be controlled so as to be focused on the photo-thermal conversion layer 13. In the inhibitory area forming step, it is preferred that the solvent is present on the cell culture base layer 11. In the production method according to the present embodiment, the cell culture base is adherable to the cells, for example, in a native state. Therefore, an area of the photo-thermal conversion layer 13 corresponding to (immediately below) an area where a cell adhesion inhibitory area 11b is formed is irradiated with light L. More specifically, in FIG. 8E, a corresponding area of the photo-thermal conversion layer 13, present immediately below the area where a cell adhesion inhibitory area 11b is formed, is irradiated with light L.

Figure 8F:
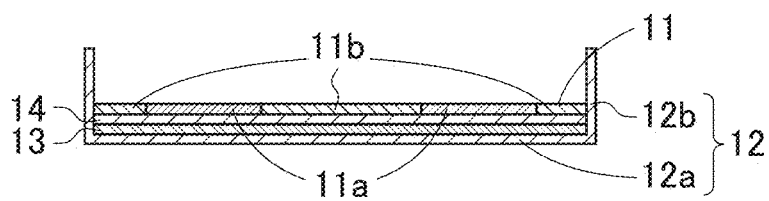

Then, in the production method according to the present embodiment, as shown in FIG. 8F, a culture tool 400 is produced. In the production method according to the present embodiment, the native cell culture base is adherable to cells. Therefore, in the inhibitory area forming step, the photo-thermal conversion layer 13 corresponding to an area where the cell adhesion inhibitory area 11b is formed is irradiated with light L. However, the present invention is not limited to this, and in the inhibitory area forming step, the photo-thermal conversion layer 13 corresponding to (immediately below) areas where cell adhesive areas 11a are formed may be irradiated with light L. In this case, the cell culture base in a denatured state is adherable to cells.

Figure 9A:
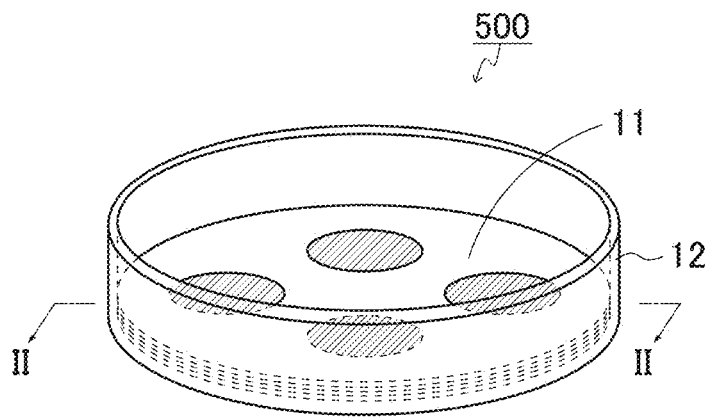
FIGS. 9A to 9C are schematic views illustrating another example of the configuration of a culture tool according to the fourth embodiment.
Figure 9B:
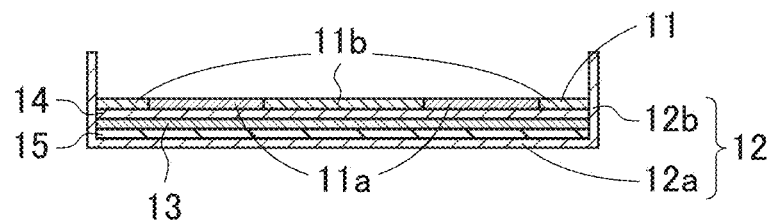
Figure 9C:
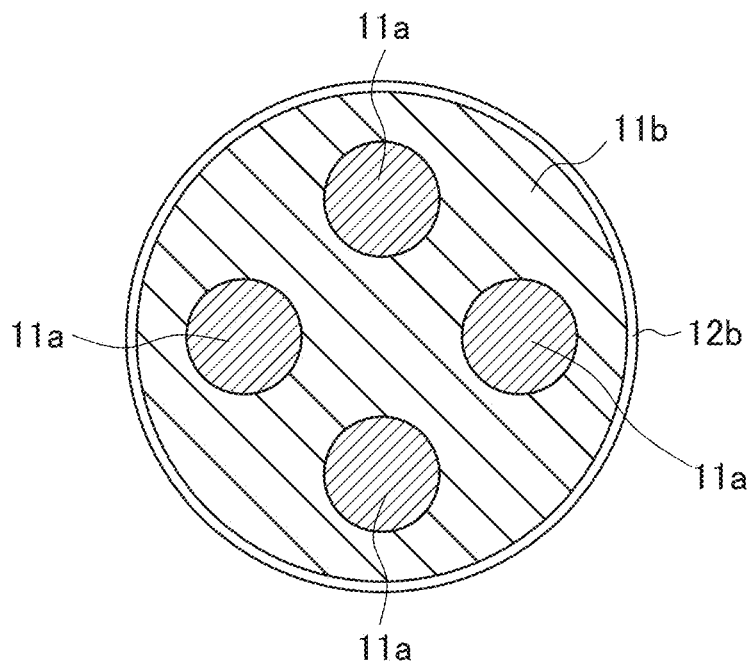

In the culture tool 400 according to the present embodiment, a photo-thermal conversion layer 13 is formed using the blocking layer 14 as an anchorage. The culture tool 400 according to the present embodiment, however, is not limited thereto, and the photo-thermal conversion layer 13 can be formed on another anchorage layer. FIG. 9A to 9C show another example of forming a photo-thermal conversion layer 13 on a support layer 15 which is another anchorage layer. FIGS. 9A to 9C are schematic views illustrating another example of the configuration of a culture tool 500 according to the fourth embodiment. FIG. 9A is a schematic perspective view of the culture tool 500. FIG. 9B is a schematic cross-sectional view of the culture tool 500 as viewed from line II-II of FIG. 9A. FIG. 9C is a plan view of the culture tool 500. As shown in FIGS. 9A to 9C, the culture tool 500 is obtained by forming a support layer 15 between the photo-thermal conversion layer 13 and the bottom surface 12a in the configuration of the culture tool 400 according to the second embodiment. Except for this point, the configuration of the culture tool 500 according to another fourth embodiment is the same as that of and can be described with reference to the description of the culture tool 400 according to the fourth embodiment.

The support layer 15 is a layer serving as an anchorage for forming a photo-thermal conversion layer 13 and can also be referred to as a base or a base layer, for example. The support layer 15 may be any support capable of forming a photo-thermal conversion layer 13 and may be, for example, a sheet-like or plate-like support. As a specific example, the support layer 15 may be a film, a thin film, or a plate made of a resin such as a polystyrene-based polymer such as polystyrene, polyethylene terephthalate (PET), a polyimide-based polymer such as polyimide, polycarbonate-based polymer such as polycarbonate, and a polyolefin-based polymer such as polyolefin; a sheet glass or film glass such as a glass substrate, or the like. As the support made of glass, slide glass, a preparation, or the like may be used.

EXAMPLES

Next, examples are described. However, the present embodiments are not limited by the following examples. Commercially available reagents were used on the basis of these protocols unless otherwise indicated.

Example 11

It was confirmed that the production method can produce the cell culture tool, and the shape and size of a cell mass after culturing can be controlled using the cell culture tool.

A culture tool 200 similar to that shown in FIGS. 3A to 3C was produced using a 35 mm (diameter) dish (Cat. No. 3000-035, manufactured by IWAKI). First, in a polymer represented by the formula (1), a polymer having a modified dye structure of the side chain was dissolved in 1,2-dichloroethane, methanol, or the like to prepare a raw material solution. The obtained raw material solution was applied to the dish by a spin coating to form a photo-thermal conversion layer 13.

Next, a cell culture base layer 11 was formed in the dish having the photo-thermal conversion layer 13 according to an attached protocol using a dilution obtained by diluting 0.2 μL of iMatrix (manufactured by Nippi Co., Ltd.) with 1.5 mL of PBS. Note that the iMatrix contains laminin 511-E8, which is capable of adhering to cells in its native state. For this reason, the cell culture base layer 11 includes cell adhesive areas 11a.

Figure 10:
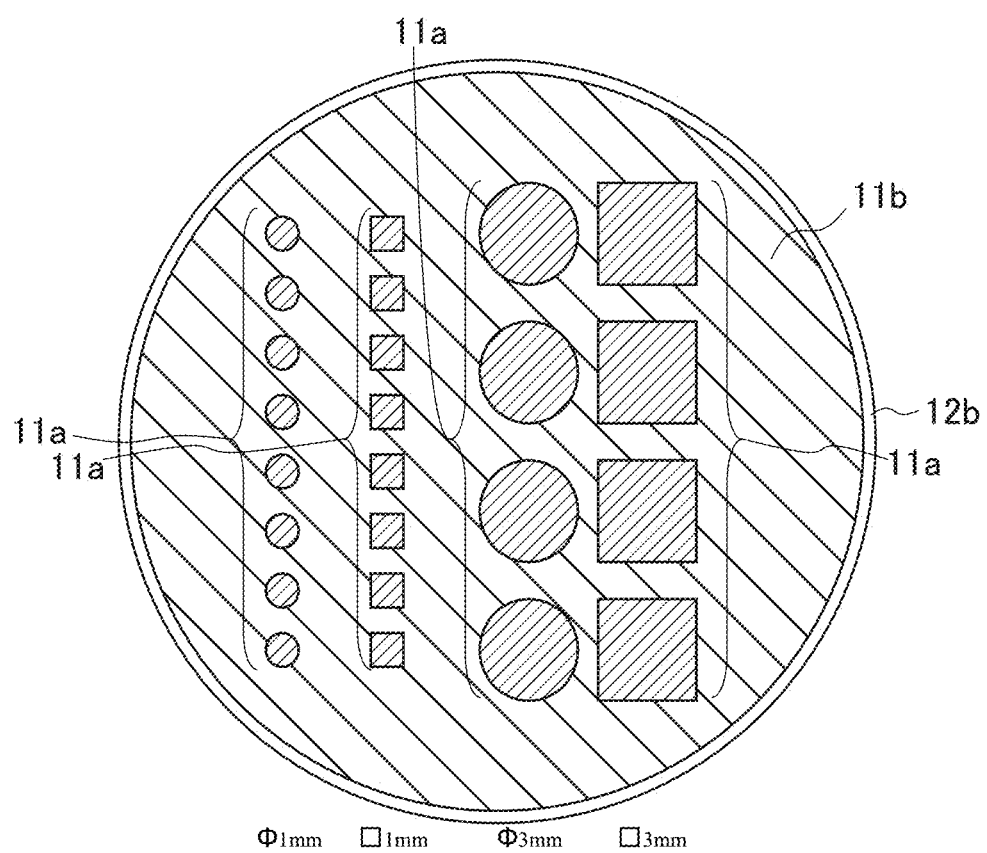
FIG. 10 is a schematic view illustrating an example of a cell culture base layer in Example 1.

The obtained dish was irradiated with a laser beam focusing on the photo-thermal conversion layer 13 using a cell treatment apparatus (LiLACK, model: CPD-017, manufactured by Kataoka Corporation) under the following laser beam irradiation condition 1. Thus, laminin 511-E8 was denatured to convert a cell adhesive area 11a into a cell adhesion inhibitory area 11b, thereby forming substantially circular or square cell adhesive areas 11a as shown in FIG. 10. The cell adhesive areas 11a include, from the left, substantially circular cell adhesive areas 11a with a diameter of 1 mm, substantially square cell adhesive areas 11a each having sides of 1 mm, substantially circular cell adhesive areas 11a with a diameter of 3 mm, and substantially square cell adhesive areas each having sides of 3 mm. The laser output power during irradiation was measured using a power meter.

(Laser Beam Irradiation Condition 1)
  Wavelength: 405 nm
  Laser output power: 0.5 W
  Laser scanning speed: 80 mm/sec
  Spot diameter: 45 μm After the laser beam irradiation, the dish was seeded with iPS cells (strain 1231A3) suspended in a broth so as to have $1 \times 10^4$ cells/1.5 ml suspension/dish in a 35 mm (diameter) dish. As the broth, Stemfit® AK02 (manufactured by Ajinomoto Co., Inc.) was used. Then, the broth was incubated for 7 days under wet conditions at 37° C. and 5% $CO_2$. The broth was replaced with an equal volume of fresh broth every 2 days. Then, tiling images of the entire surface of the dish after culturing were photographed using a phase-contrast microscope of the cell treatment apparatus to produce an image of the entire surface of the dish. In addition, an image of the entire surface of the dish was produced in the same manner as described above except that the shapes of the cell adhesive areas 11a were the respective characters (iPS) as a substitute for the pattern of the cell adhesive areas 11a shown in FIG. 10. The results are shown in FIGS. 11A to 11C and 12.

FIGS. 11A and 11C are photographs of iPS cells after culturing in the dish subjected to the laser beam treatment in the pattern shown in FIG. 10. FIG. 11A is a photograph of the entire surface of the dish. FIG. 11B is a photograph in the case where each cell adhesive area 11a has a substantially circular shape with a diameter of 1 mm in FIG. 11A. FIG. 11C is a photograph in the case where each cell adhesive area 11a has a substantially square shape having sides of 1 mm in FIG. 11A. In FIGS. 11A to 11C, as indicated by arrows, the shape of the outer edge of the iPS cells after culturing coincided with the shape of the outer edge of each cell adhesive area 11a before culturing regardless of the substantially circular shape or the substantially square shape. In FIGS. 11A to 11C, as indicated by arrows, the shape of the outer edge of the iPS cells after culturing coincided with the shape of the outer edge shape of each cell adhesive area 11a before culturing regardless of the size of the cell adhesive area 11a.

Figure 12:
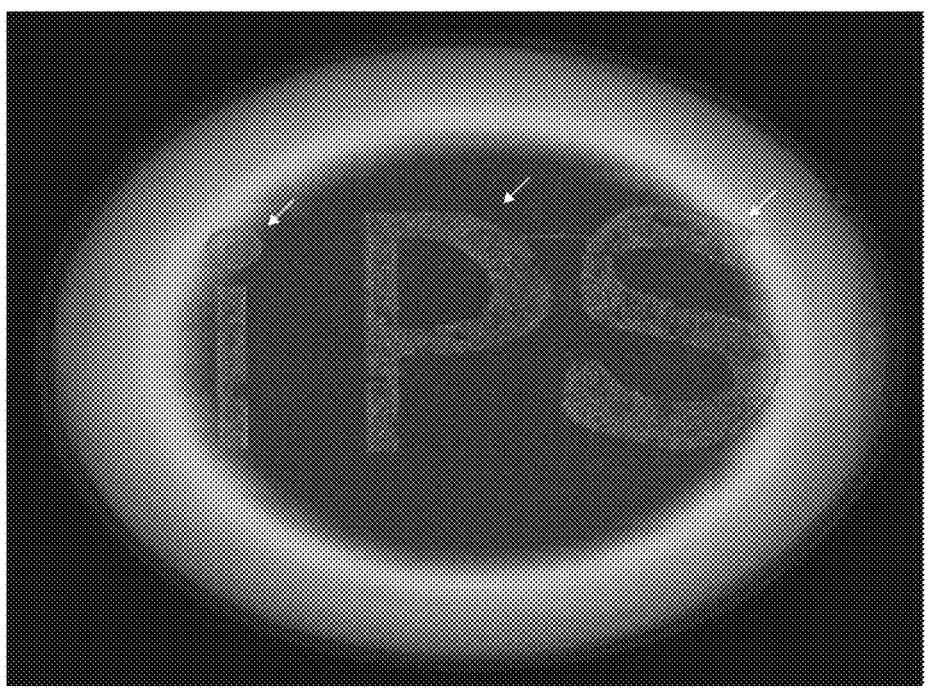
FIG. 12 is another photograph of cells after culturing in Example 1.

Next, a result obtained when the shapes of the cell adhesive areas 11a are the respective characters string (iPS) is shown. FIG. 12 is a photograph of iPS cells after culturing in a dish subjected to laser beam treatment so that the shapes of the cell adhesive areas 11a become the respective characters (iPS). As shown in FIG. 12, the shape of the outer edge of the iPS cells after culturing coincided with each of the shapes (characters: iPS) of cell adhesive areas 11a before culturing.

These results demonstrate that the production method can produce the cell culture tool, and the shape and size of a cell mass after culturing can be controlled using the cell culture tool.

Example 2

In the production method, the temperature of the photo-thermal conversion layer 13 at the time of light irradiation was measured.

A dish having a photo-thermal conversion layer 13 and a cell culture base layer 11 was produced in the same manner as in Example 1. Next, the obtained dish was irradiated with a laser beam using the cell treatment apparatus under the following laser beam irradiation condition 2. Note that the laser beam irradiation condition 2 described below is a condition for confirming that the cells after laser beam irradiation cannot adhere to the cell culture base layer 11, and in the case where the cells are irradiated with a laser beam at the time when cells adhere, the cells in an area irradiated with a laser beam die. In addition, at the time of laser irradiation, the temperature of an area of the photo-thermal conversion layer 13 irradiated with a laser beam was measured using an infrared thermography camera (InfReC H9000, manufactured by Nippon Avionics Corporation) and 5 μm microscopic lenses (Examples). The measurement wavelength of the infrared thermography camera was 2 to 5.7 μm, the frame rate was 200 Hz, and the shutter speed was 215 μs. The temperature of the photo-thermal conversion layer 13 before the laser beam irradiation was about 29° C. In addition, a control was formed, irradiated with a laser beam, and subjected to the same measurement in the same manner except that a photo-thermal conversion layer 13 and a cell culture base layer 11 were not formed, and the temperature of the bottom surface of a dish was measured. These results are shown in FIGS. 13A and 13B.

Figures 13A, 13B:
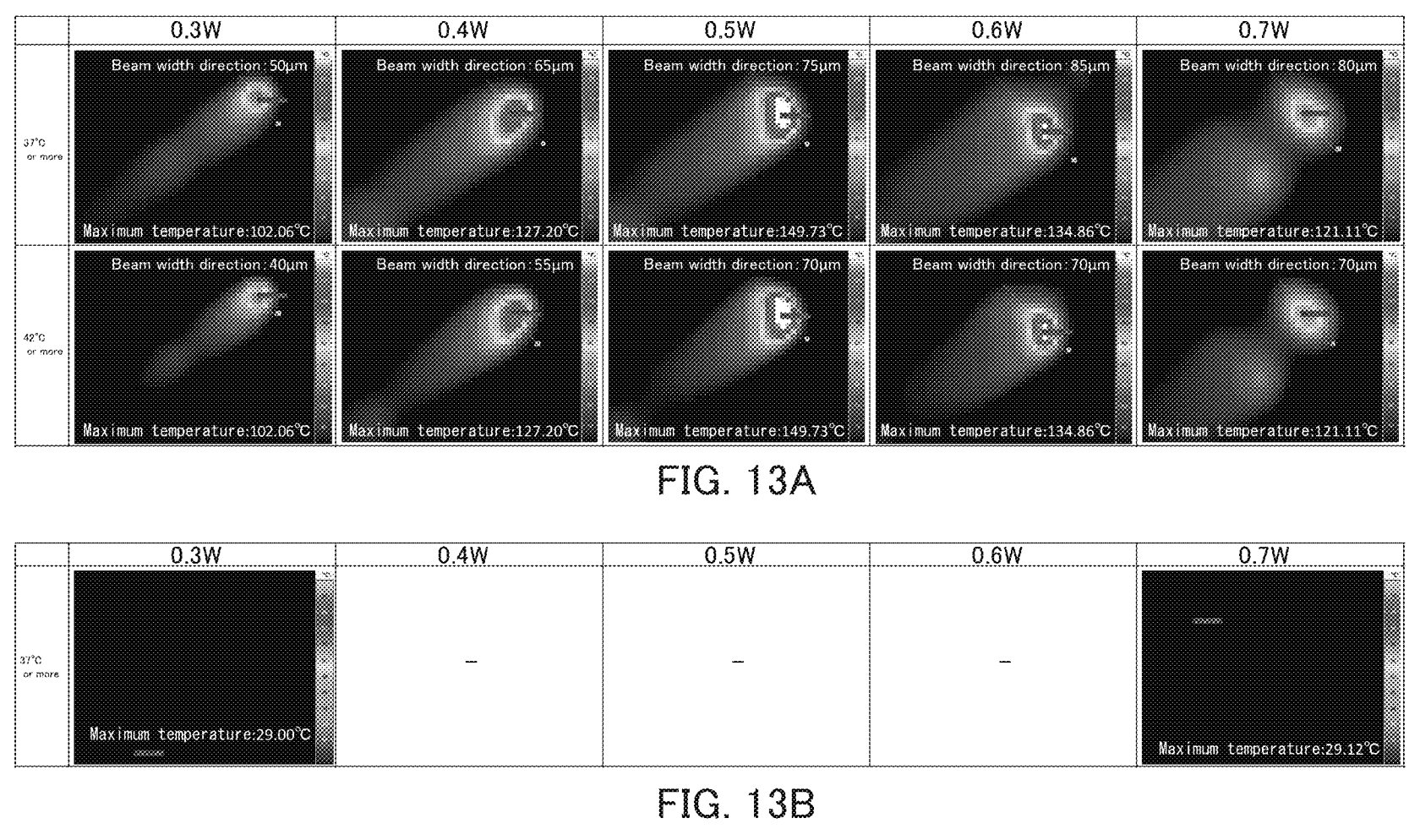

(Laser Beam Irradiation Condition 2)
　Wavelength: 405 nm
　Laser output power: 0.3, 0.4, 0.5, 0.6, or 0.7 W
　Laser scanning speed: 80 mm/sec
　Spot diameter: 45 μm FIGS. 13A and 13B are photographs showing the temperature of an area of the photo-thermal conversion layer 13 irradiated with a laser beam. FIG. 13A shows the results of the examples and FIG. 13B shows the results of control. In FIG. 13A, the upper photographs show areas at 37° C. or more, and the lower photographs show areas at 42° C. or more. As shown in FIG. 13B, in the case of the dish having no photo-thermal conversion layer 13, the temperature of the bottom surface of the dish did not increase. On the other hand, in the case of the dish having a photo-thermal conversion layer 13, the temperature of the photo-thermal conversion layer 13 was increased depending on the laser output power by the laser irradiation, and the maximum temperature of an area irradiated with a laser beam was around 140° C. at the output power of 0.5 W or more. Furthermore, it was demonstrated from the temperature distribution of an area of the photo-thermal conversion layer 13 irradiated with a laser beam and an area to which cells are adherable after laser beam irradiation that the cell culture base in the cell culture base layer 11 can be efficiently denatured by adjusting the temperature of the area of the photo-thermal conversion layer 13 irradiated with a laser beam to 60° C. or more, such as 100° C. or 110° C.

Example 3

It was confirmed that the production method can produce the cell culture tool, and the shape and size of a cell mass after culturing can be controlled using the cell culture tool.

A culture tool 100 similar to that shown in FIGS. 1A to 1C was produced using a 35 mm (diameter) dish. Specifically, a dilution of iMatrix was prepared in the same manner as in Example 1 to form a cell culture base layer 11.

The obtained dish was irradiated with a laser beam focusing on the cell base layer 11 using the cell treatment apparatus under the laser beam irradiation condition 3. Thus, laminin 511-E8 was denatured to convert a cell adhesive area 11a into a cell adhesion inhibitory area 11b, thereby forming a substantially circular cell adhesive area 11a each with a diameter of 1 mm or a substantially square cell adhesive area 11a each having sides of 1 mm. The laser output power during irradiation was measured using a power meter.

(Laser Beam Irradiation Condition 3)
　Wavelength: 1450 nm
　Laser output power: 0.6 W
　Laser scanning speed: 5 mm/sec or less
　Spot diameter: 75 μm After the laser beam irradiation, the dish was seeded with the iPS cells (strain 1231A3) suspended in a broth so as to have $1 \times 10^4$ cells/1.5 ml suspension/dish in a 35 mm (diameter) dish. As the broth, Stemfit® AK02 (manufactured by Ajinomoto Co., Inc.) was used. Then, the broth was incubated for 10 days under wet conditions at 37° C. and 5% $CO_2$. The broth was replaced with an equal volume of fresh broth every 2 days. Then, an image of the entire surface of the dish after culturing was photographed using a phase-contrast microscope of the cell treatment apparatus, to obtain an image of each cell adhesive area 11a. These results are shown in FIGS. 14A and 14B.

Figure 14A:
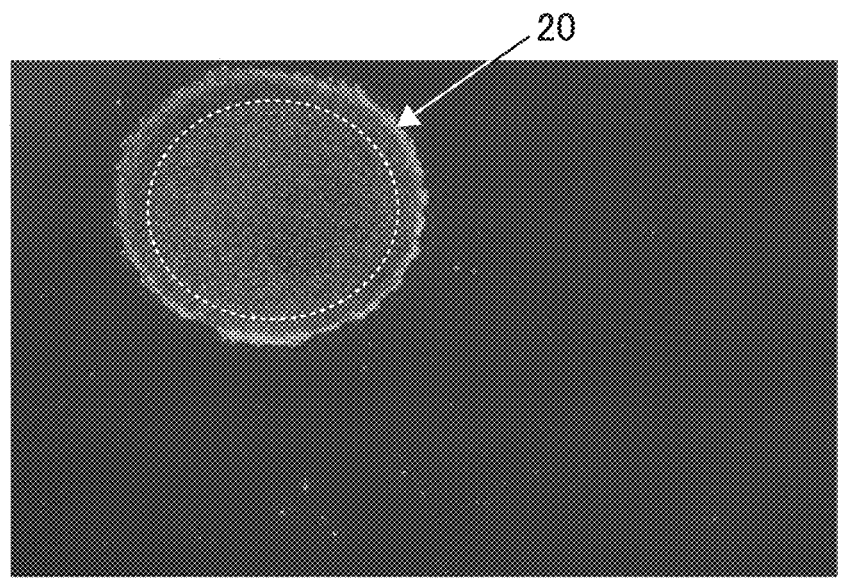
FIGS. 14A and 14B are photographs of cells after culturing in Example 3.
Figure 14B:
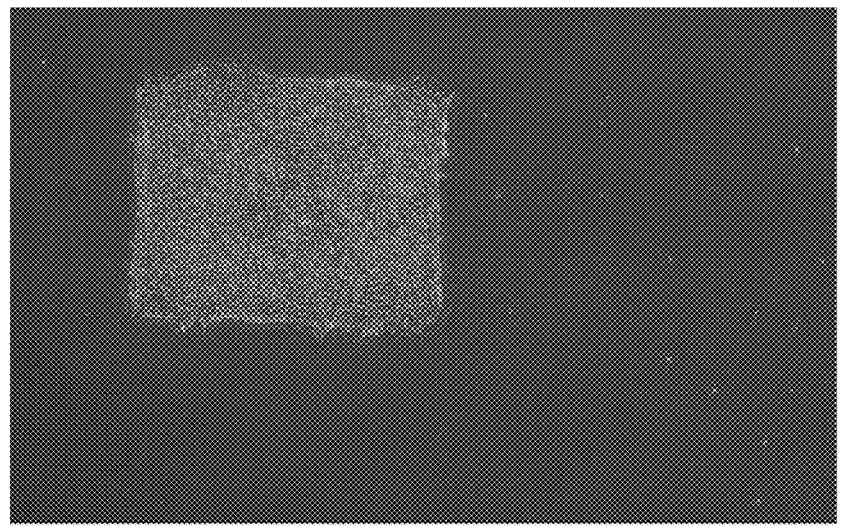

FIGS. 14A and 14B are photographs of iPS cells after culturing. FIG. 14A is a photograph of a substantially circular cell adhesive area 11*a* with a diameter of 1 mm, and FIG. 14B is a photograph of a substantially square cell adhesive area 11*a* having sides of 1 mm. In FIGS. 14A and 14B, as indicated by arrows, the shape of the outer edge of the surface to which the iPS cells adhere after culturing coincided with the shape of the outer edge of each cell adhesive area 11*a* before culturing regardless of the substantially circular shape or the substantially square shape. As indicated by an arrow 20 of FIG. 14A, some iPS cells were extended out of the outer edge (broken line) of the cell adhesive area 11*a*, and the cell adhesive area 11*a* was turned up and did not adhere to the cell adhesion inhibitory area 11*b*.

These results demonstrate that the production method can produce the cell culture tool, and the shape and size of a cell mass after culturing can be controlled using the cell culture tool.

Example 4

It was confirmed that the production method can produce the cell culture tool, and the shape and size of a cell mass after culturing can be controlled using the cell culture tool.

A culture tool 200 similar to that shown in FIGS. 3A to 3C was produced in the same manner as in Example 1 using a 35 mm (diameter) dish. Specifically, a photo-thermal conversion layer 13 was formed, and a dilution of iMatrix was then prepared to form a cell culture base layer 11 in the same manner as in Example 1.

The obtained dish was irradiated with a laser beam focusing on the photo-thermal conversion layer 13 using the cell treatment apparatus under the following laser beam irradiation condition 4. Thus, laminin 511-E8 was denatured to convert cell adhesive areas 11*a* into cell adhesion inhibitory areas 11*b*, thereby forming cell adhesive areas 11*a* in a lattice pattern. For this reason, the inside of each lattice is the cell adhesion inhibitory area 11*b*. The laser output power during irradiation was measured using a power meter.

(Laser Beam Irradiation Condition 4)
  Wavelength: 405 nm
  Laser output power: 0.5 W
  Laser scanning speed: 80 mm/sec
  Spot diameter: 45 μm After the laser beam irradiation, the dish was seeded with iPS cells (strain 1231A3) suspended in a broth so as to have 1×10$^5$ cells/dish in a 35 mm (diameter) dish. As the broth, Stemfit® AK02 (manufactured by Ajinomoto Co., Inc.) was used. Then, the broth was incubated for 1 day under wet conditions at 37° C. and 5% $CO_2$. Then, tiling images of the entire surface of the dish after culturing were photographed using a phase-contrast microscope of the cell treatment apparatus to produce an image of the entire surface of the dish. These results are shown in FIGS. 15A and 15B.

Figure 15A:
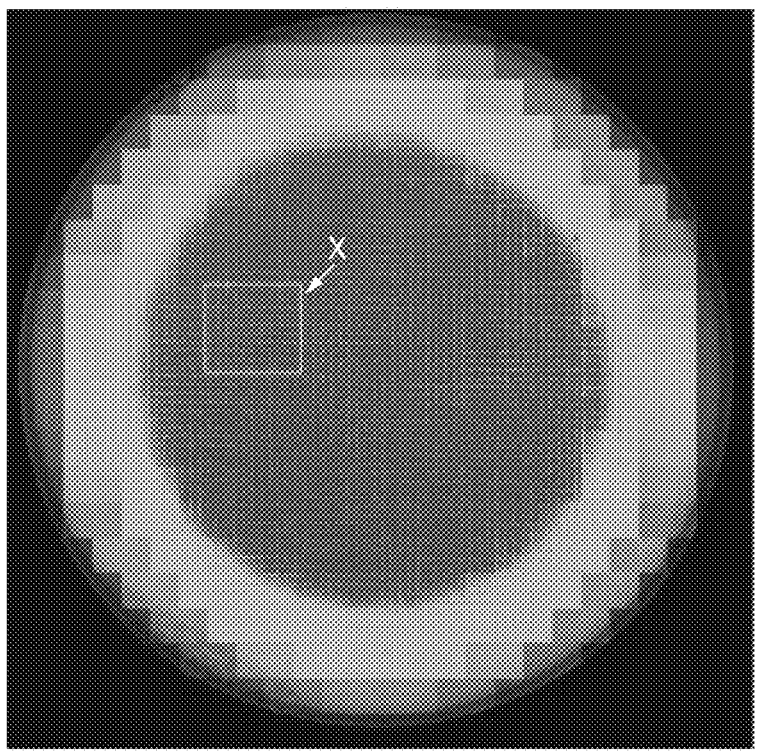
FIGS. 15A and 15B are photographs of iPS cells after culturing in Example 4.
Figure 15B:
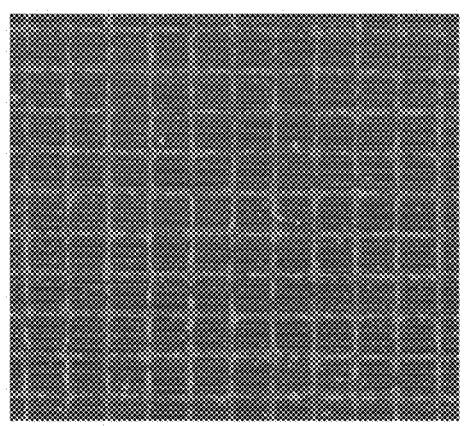

FIGS. 15A and 15B are photographs of iPS cells after culturing. FIG. 15A is a photograph of an image of the entire surface of the dish. FIG. 15B is an enlarged photograph of a surrounded area indicated by an arrow X in FIG. 15A. As shown in FIGS. 15A and 15B, the shape of the outer edge of the surface to which the iPS cells adhere after culturing was in a lattice pattern and coincided with the shape of the outer edge of the cell adhesive area 11*a* before culturing. As shown in FIGS. 15A and 15B, cells hardly adhered to the inside of each lattice, serving as the cell adhesion inhibitory area 11*b*.

These results demonstrate that the production method can produce the cell culture tool, and the shape and size of a cell mass after culturing can be controlled using the cell culture tool.

Example 51

It was confirmed that the production method can produce the cell culture tool, and the shape and size of a cell mass after culturing can be controlled using the cell culture tool.

A culture tool 200 similar to that shown in FIGS. 3A to 3C was produced in the same manner as in Example 1 using a 35 mm (diameter) polystyrene dish (manufactured by AGC Technoglass). Specifically, first, a photo-thermal conversion layer 13 was formed in the same manner as in Example 1. Next, a cell culture base layer 11 was formed by using a dilution of Laminin-521 (rhLaminin-521, Cat No. A29248, manufactured by Thermo Fisher Scientific) as a substitute for the dilution of iMatrix in Example 1 and introducing the dilution so as to be 0.5 μg/cm$^2$ according to an attached protocol. The dilution of Laminin-521 was prepared by diluting Laminin-521 with DPSB (Dulbecco's phosphate-buffered saline, DPBS, calcium, magnesium, Cat. No.: 14040141, manufactured by Thermo Fisher Scientific) containing calcium and magnesium.

Figure 16A:
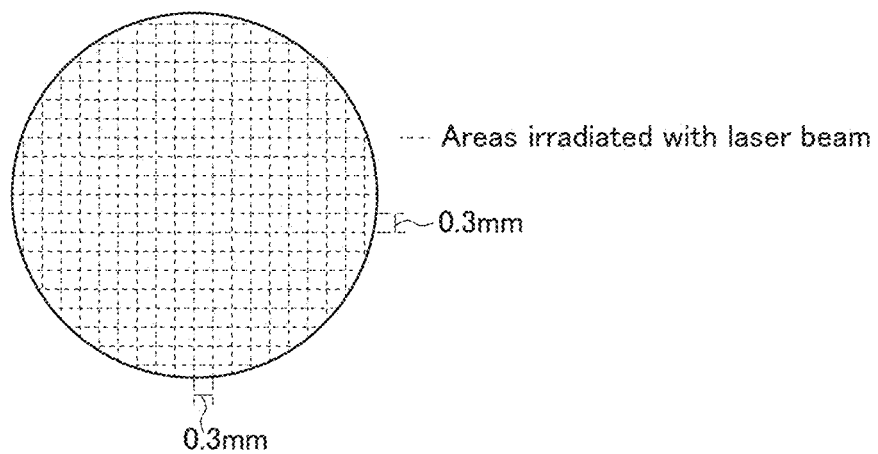
FIGS. 16A to 16C are charts illustrating treatment of cells in Example 5.

The obtained dish was irradiated with a laser beam focusing on the photo-thermal conversion layer 13 using the cell treatment apparatus under the following laser beam irradiation condition 5 so as to have a pattern shown in FIG. 16A. Thus, laminin-521 was denatured to convert cell adhesive areas 11*a* into cell adhesion inhibitory areas 11*b*, thereby forming cell adhesion inhibitory areas 11*b* in a lattice pattern. Thus, each inner area in the lattice pattern (square area of about 0.3 mm×about 0.3 mm) is a cell adhesive area 11*a*. The laser output power during irradiation was measured using a power meter.

(Laser Beam Irradiation Condition 5)
  Wavelength: 405 nm
  Laser output power: 0.5 W
  Laser scanning speed: 80 mm/sec
  Spot diameter: 45 μm
  Pitch: 0.3 mm After the laser irradiation, the dish was seeded with iPS cells (strain 1231A3) suspended in a broth so as to have 1×10$^5$ cells/1.5 ml suspension/dish in a 35 mm (diameter) dish. As the broth, a E8 medium (Essential 8 (trademark) medium, Cat. No.: A1517001, manufactured by Thermo Fisher Scientific Corporation) was used. Then, the broth was incubated for 3 days under wet conditions at 37° C. and 5% $CO_2$. The broth was replaced with an equal volume of fresh broth every 2 days. Then, tiling images of the entire surface of the dish after culturing were photographed using a phase-contrast microscope of the cell treatment apparatus to produce an image of the entire surface of the dish. These results are shown in FIGS. 16A to 16C.

Figure 16B:
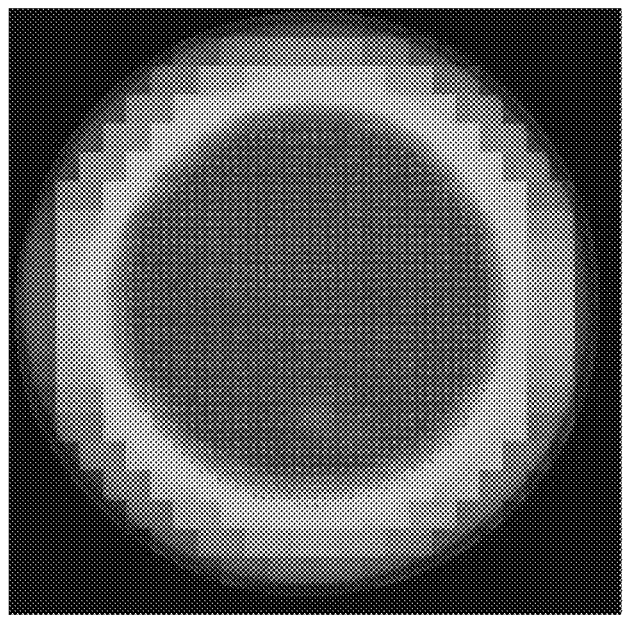
Figure 16C:
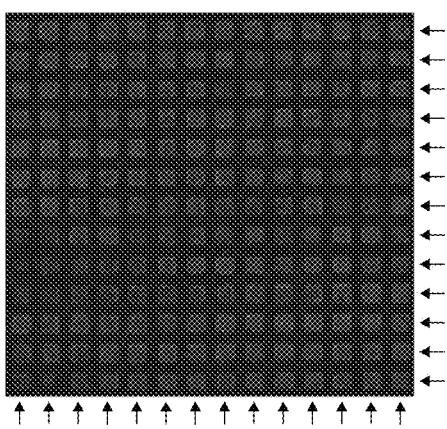

FIGS. 16A to 16C are charts illustrating treatment of cells. FIG. 16

A is a schematic view illustrating an area of the cell culture tool irradiated with a laser beam. FIG. 16B is a photograph showing the cells in the entire culture tool after culturing. FIG. 16C is an enlarged photograph of the central area of the culture tool in the photograph of FIG. 16B. As shown in FIGS. 16B and 16C, iPS cells did not adhere to the cell adhesion inhibitory areas 11*b* in a lattice pattern. As indicated by arrows of FIG. 16C, iPS cells adhered to the cell adhesive areas 11*a* inside the cell adhesion inhibitory areas 11*b* in a lattice pattern.

These results demonstrate that the production method can produce the cell culture tool, and the shape and size of a cell mass after culturing can be controlled using the cell culture tool.

Example 6

It was confirmed that the production method can produce the cell culture tool, and the shape and size of a cell mass after culturing can be controlled using the cell culture tool.

A culture tool 200 similar to that shown in FIGS. 3A to 3C was produced in the same manner as in Example 1 using a 35 mm (diameter) polystyrene dish (manufactured by AGC Technoglass). Specifically, a photo-thermal conversion layer 13 was formed in the same manner as in Example 1. Next, the cell culture base layer 11 was formed using a dilution of Matrigel as a substitute for the dilution of iMatrix in Example 1. The dilution of Matrigel was prepared by diluting Matrigel® (Corning® Matrigel Basal Membrane Matrix Growth Factor Reduced, Cat. No.: 35623, manufactured by Corning) with a DMEM medium (4.5 g/L Glucose, Cat. No.: 08459-64, manufactured by Nacalai Tesque) 50-fold.

Figure 17A:
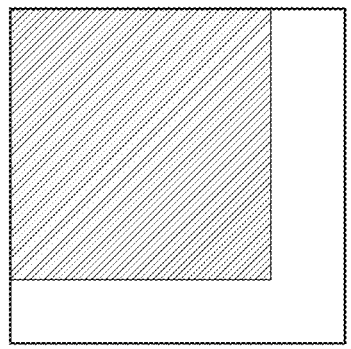
FIGS. 17A and 17B are photographs of iPS cells after culturing in Example 6.

The obtained dish was irradiated with a laser beam focusing on the photo-thermal conversion layer 13 using the cell treatment apparatus under the following laser beam irradiation condition 6 so as to have a pattern shown in FIG. 17A. Thus, laminin in the Matrigel was denatured to convert cell adhesive areas 11a into cell adhesion inhibitory areas 11b, thereby forming linear cell adhesion inhibitory areas 11b. Therefore, areas between the straight lines are the cell adhesive areas 11a. The laser output power during irradiation was measured using a power meter.

(Laser Beam Irradiation Condition 6)
Wavelength: 405 nm
Laser output power: 0.3 W
Laser scanning speed: 10 mm/sec
Spot diameter: 45 µm
Pitch: 0.03 mm After the laser beam irradiation, the dish was seeded with iPS cells (strain 1231A3) suspended in a broth so as to have $5 \times 10^4$ cells/1.5 ml suspension/dish in a 35 mm (diameter) dish. As the broth, mTeSR® Plus (Cat. No.: 05825, manufactured by STEMCELL technologies) was used. Then, the broth was incubated for 7 days under wet conditions at 37° C. and 5% $CO_2$. The broth was replaced with an equal volume of fresh broth every 2 days. Then, tiling images of the entire surface of the dish after culturing were photographed using a phase-contrast microscope of the cell treatment apparatus to produce an image of the entire surface of the dish. These results are shown in FIGS. 17A and 17B.

Figure 17B:
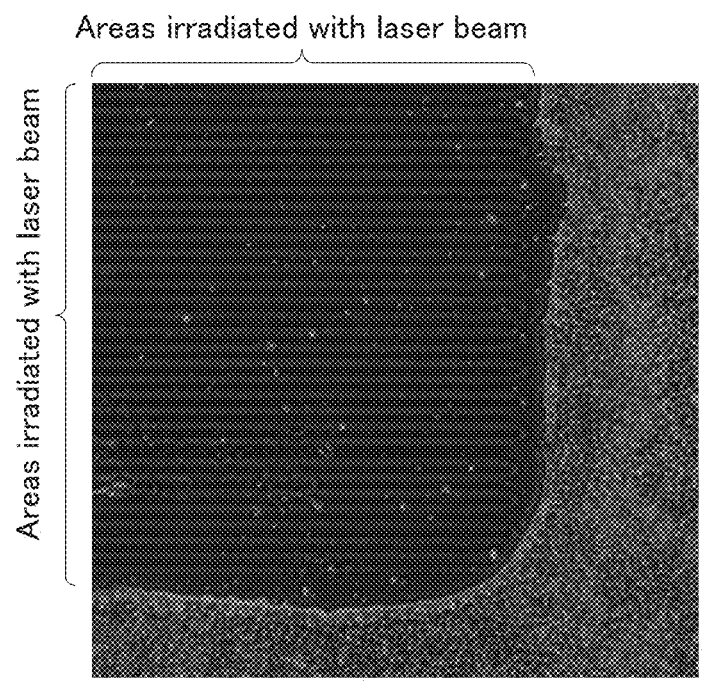

FIGS. 17A and 17B are charts illustrating results of cell treatment. FIG. 17A is a schematic diagram illustrating an area of the cell culture tool irradiated with a laser beam. FIG. 17B is a photograph showing the cells after culturing. As shown in FIG. 17B, the iPS cells did not adhere to the linear cell adhesion inhibitory areas 11b and adhered to the cell adhesive areas 11a.

These results demonstrate that the production method can produce the cell culture tool, and the shape and size of a cell mass after culturing can be controlled using the cell culture tool.

INDUSTRIAL APPLICABILITY

The cell culture tool can be produced in a simple facility, and with the cell culture tool, a cell mass having a desired shape can be obtained. For this reason, such cell culture tool can be extremely useful in the life sciences field, the medical field, and the like in which cells, tissues, and the like are processed.

What is claimed is:

1. A cell culture tool including:
   a vessel including a flat bottom surface,
   a cell culture base layer that contains a cell culture base, and
   a photo-thermal conversion layer configured to convert light into heat,
   wherein
   the photo-thermal conversion layer is disposed on the flat bottom surface,
   the cell culture base layer is disposed on the photo-thermal conversion layer,
   a cell is not disposed on the cell culture base layer,
   the cell culture base layer has a cell adhesive area to which a cell is adherable and a cell adhesion inhibitory area where cell adhesion is inhibited,
   the cell adhesion inhibitory area includes a heat-denatured product of the cell culture base,
   the cell culture base is an extracellular matrix, and
   the flat bottom surface comprises a single flat bottom surface, an entirety of the vessel having the single flat bottom surface.

2. The cell culture tool according to claim 1, further comprising:
   a blocking layer for blocking contact between the cell culture base layer and the photo-thermal conversion layer, wherein
   the blocking layer is disposed on the photo-thermal conversion layer, and
   the cell culture base layer is disposed on the blocking layer.

3. The cell culture tool according to claim 1, wherein the photo-thermal conversion layer comprises a polymer having a dye structure that absorbs light.

4. The cell culture tool according to claim 1, wherein the cell adhesive area comprises a native cell culture base.

5. The cell culture tool according to claim 1, wherein the cell culture base is a protein or peptide fragment thereof.

6. The cell culture tool according to claim 1, wherein the cell culture base is laminin or a fragment thereof.

7. A method for producing a cell culture tool, the method comprising:
   an inhibitory area forming step of irradiating a cell culture tool including a cell culture base layer that includes a cell culture base with light to heat-denature the cell culture base and form a cell adhesion inhibitory area where cell adhesion is inhibited,
   wherein
   the cell culture tool includes a vessel including a flat bottom surface and a photo-thermal conversion layer configured to convert light into heat,
   the photo-thermal conversion layer is disposed on the flat bottom surface,
   the cell culture base layer is disposed on the photo-thermal conversion layer,
   a cell is not disposed on the cell culture base layer,
   in the inhibitory area forming step, the photo-thermal conversion layer is irradiated with the light,
   the cell culture base is an extracellular matrix, and
   the flat bottom surface comprises a single flat bottom surface, an entirety of the vessel having the single flat bottom surface.

8. The method according to claim 7, wherein
the cell culture tool includes a blocking layer for blocking contact between the cell culture base layer and the photo-thermal conversion layer,
the blocking layer is disposed on the photo-thermal conversion layer, and
the cell culture base layer is disposed on the blocking layer.

9. The method according to claim 7, wherein
the light is infrared light, and
in the inhibitory area forming step, the cell culture base layer is irradiated with the infrared light.

10. The method according to claim 7, wherein in the inhibitory area forming step, the cell culture base layer is irradiated with the light such that the temperature of the cell culture base becomes 50° C. or more.

11. The method according to claim 7, wherein before the inhibitory area forming step, the cell culture base is a native cell culture base.

12. The method according to claim 7, wherein the light is a laser beam.

13. The method according to claim 7, wherein the cell culture base is a protein or peptide fragment thereof.

14. The method according to claim 7, wherein the cell culture base is laminin or a fragment thereof.

* * * * *